United States Patent [19]
Hsiao et al.

[11] Patent Number: 5,890,154
[45] Date of Patent: Mar. 30, 1999

[54] MERGING DATABASE LOG FILES THROUGH LOG TRANSFORMATIONS

[75] Inventors: Hui-I Hsiao; Ming-Ling Lo, both of Yorktown Heights, N.Y.

[73] Assignee: International Business Machines Corp., Armonk, N.Y.

[21] Appl. No.: 870,991

[22] Filed: Jun. 6, 1997

[51] Int. Cl.[6] .................................................. G06F 17/00
[52] U.S. Cl. ........................ 707/8; 707/2; 707/3; 707/201
[58] Field of Search ........................ 707/1–206; 345/419; 395/182.13; 705/43

[56] References Cited

U.S. PATENT DOCUMENTS

| | | | |
|---|---|---|---|
| 5,043,866 | 8/1991 | Myre et al. | 707/202 |
| 5,157,779 | 10/1992 | Washburn et al. | 395/183.13 |
| 5,220,501 | 6/1993 | Lawlor et al. | 705/43 |
| 5,481,699 | 1/1996 | Saether | 395/182.13 |
| 5,751,289 | 5/1998 | Myers | 345/419 |

*Primary Examiner*—Wayne Amsbury
*Assistant Examiner*—David Yiak Juy

*Attorney, Agent, or Firm*—Kevin M. Jordan; Baker & Botts, L.L.P.

[57] ABSTRACT

A method to construct a global equivalent database log file that transforms local log files from a parallel or distributed database system by extracting from each log file sequences of log entries from each database record, breaking the sequences into a series of segments, discarding the bulk of the segments and shortening other segments, then merging the remaining segments into an equivalent log file. The sequences are called "UID-sequences" and the segments "UID-segments" because they relate to one unique record ID or UID. The method also employs backward and forward superposition to further shorten the segments. This method works on database systems with or without instant constraint checks and also provides for treating log entries from multiple adjacent transactions on a log file as a single transaction. In systems with instant constraint checks, this method performs a "unique-key check" and a "foreign-key check" and resolves conflicts that are created because of superposition.

28 Claims, 12 Drawing Sheets

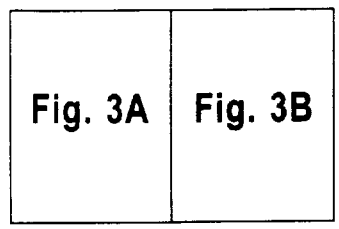
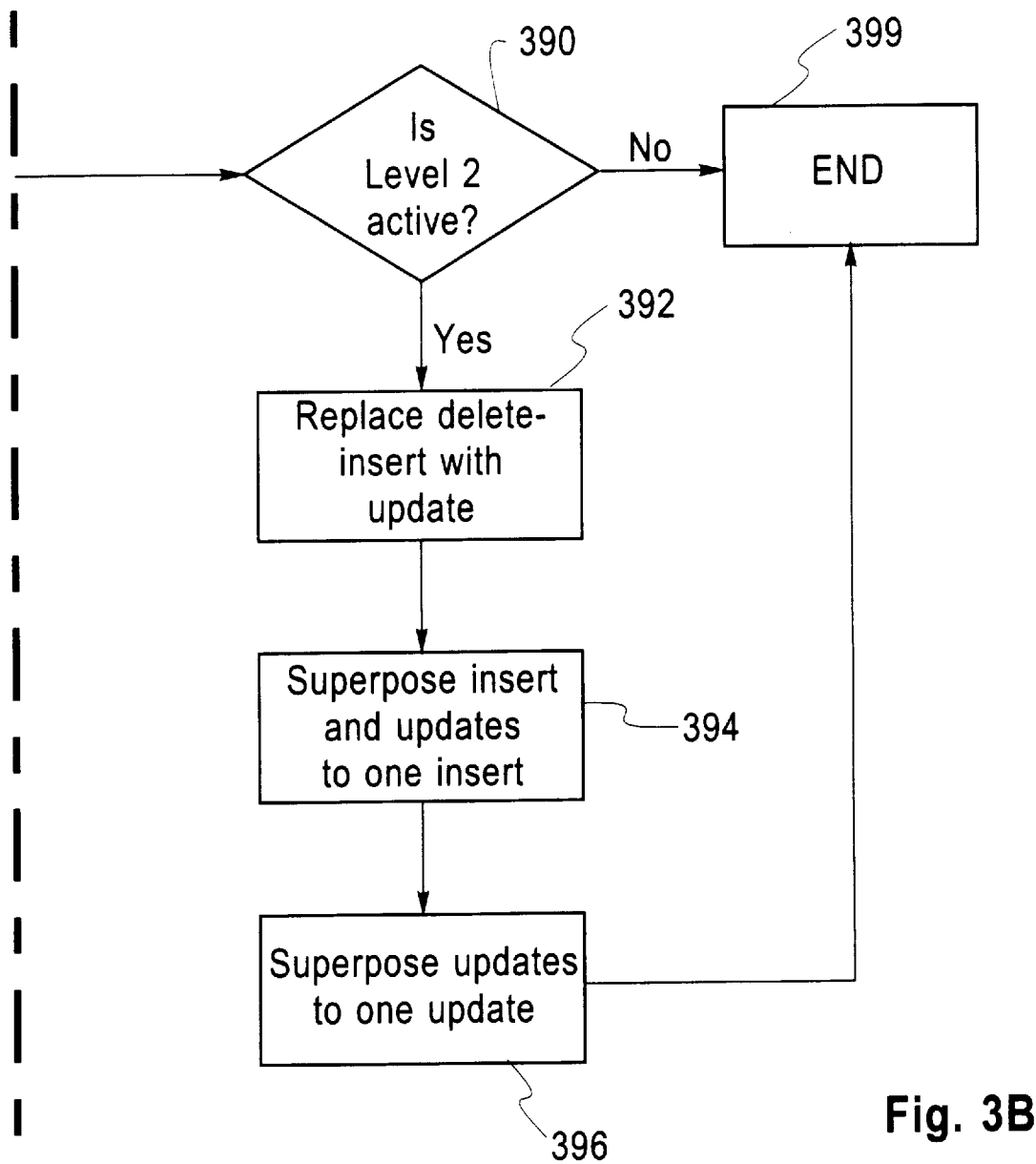
Fig. 3B

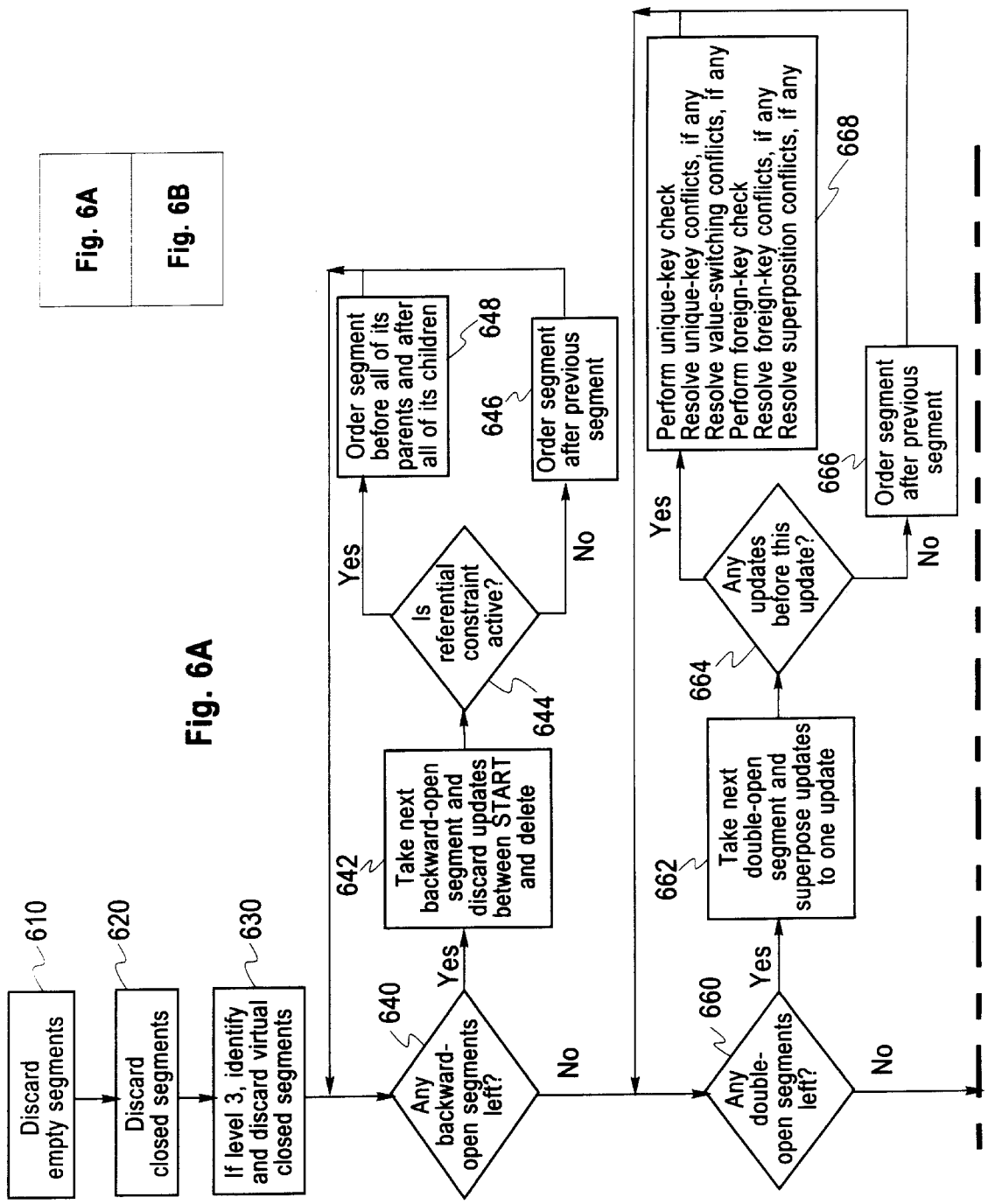

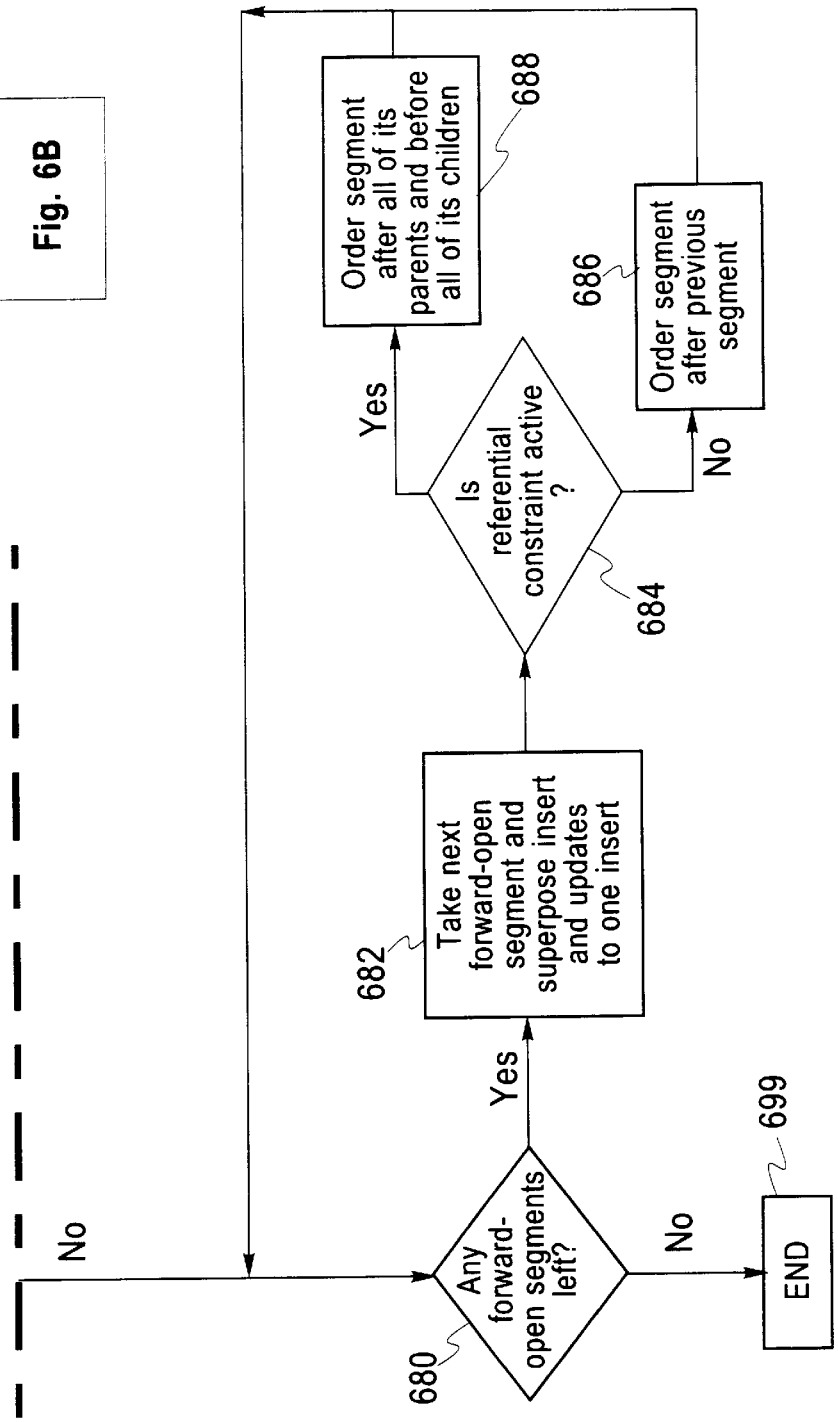

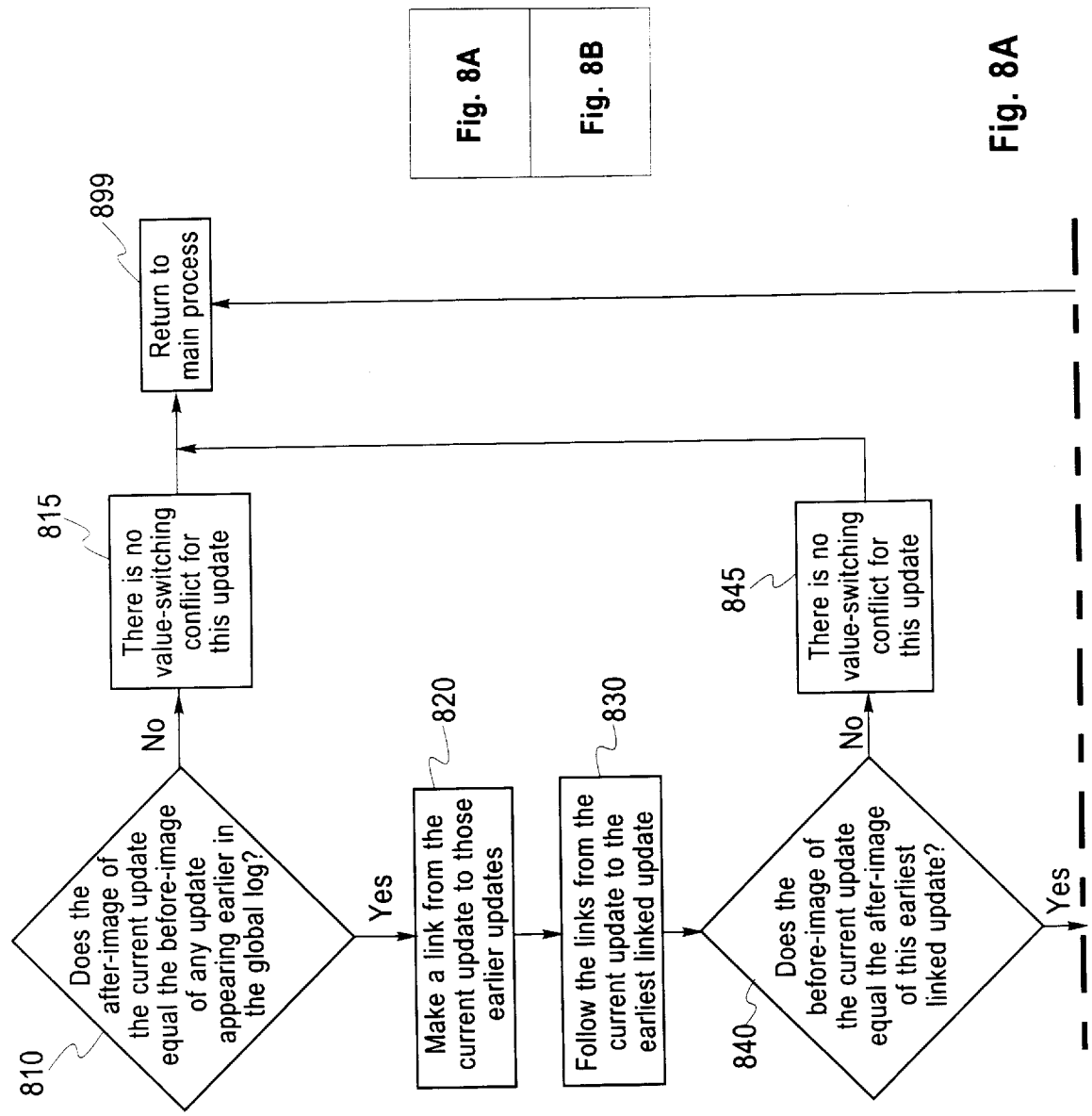

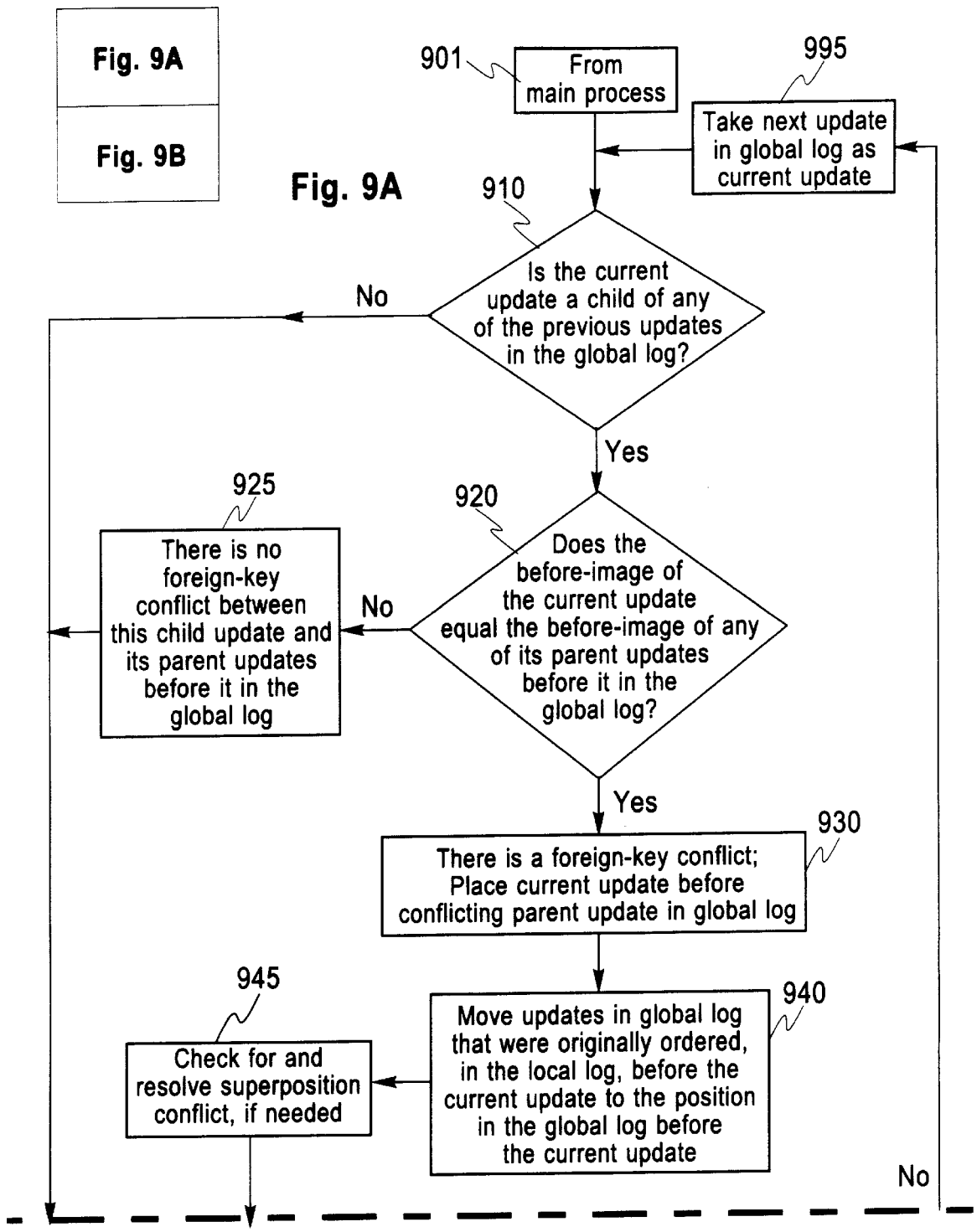

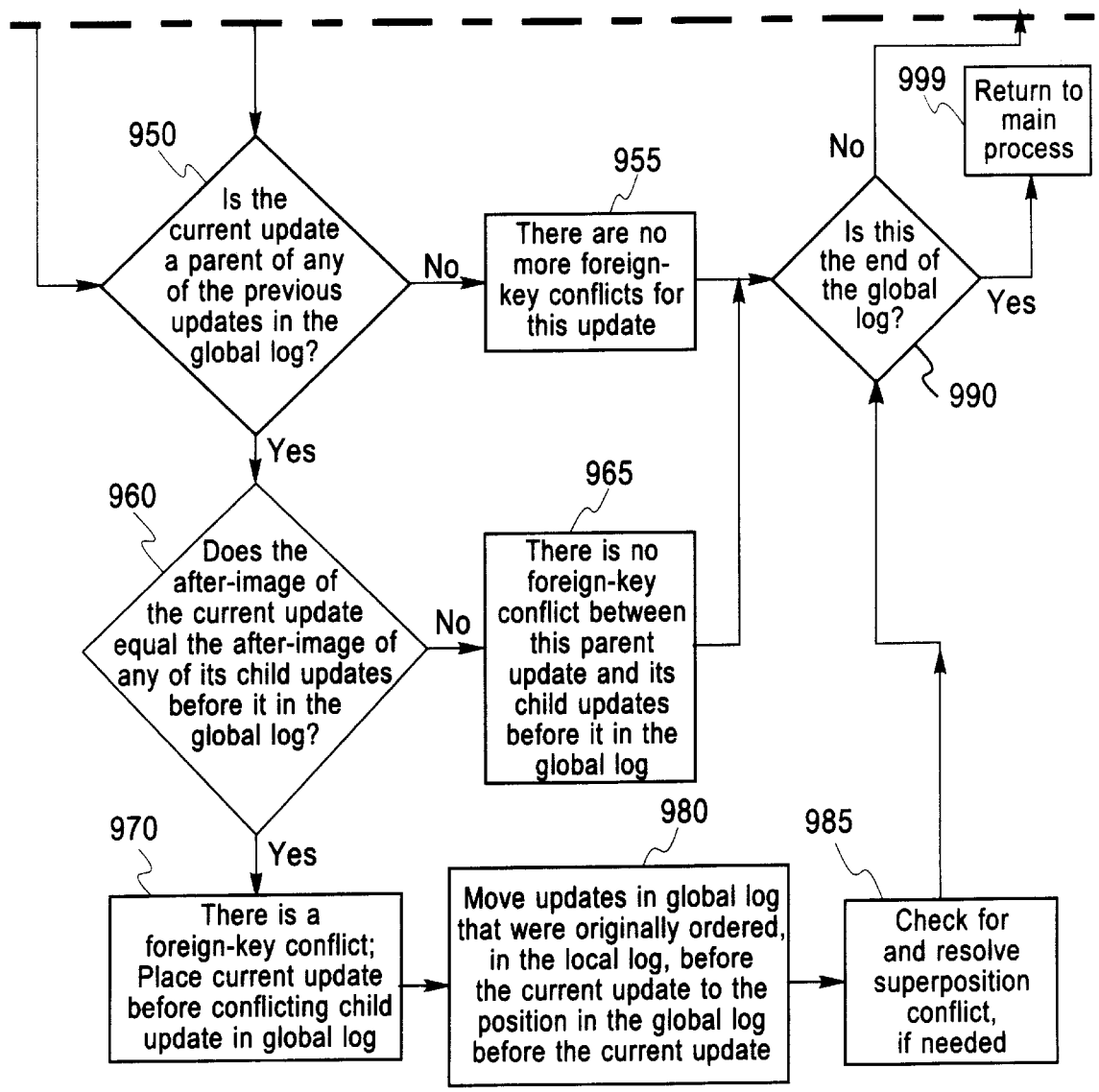

MERGING DATABASE LOG FILES THROUGH LOG TRANSFORMATIONS

RELATED APPLICATION

This application is related to a co-pending application by the same inventors entitled "Constructing a Transaction Serialization Order Based on Parallel or Distributed Database Log Files, " U.S. Application Ser. No. 08/871,001, filed Jun. 6, 1997.

BACKGROUND OF THE INVENTION

1. Field of the Invention

This invention is related to computers and computer systems, and in particular to database management systems (DBMS).

2. Description of the Related Art

A database management system keeps track of changes made to a database during its lifetime. These changes are called "transactions" and each transaction is made up of operations such as insert, update, and delete. The operations are recorded in a "log file" in the order in which the operations are performed in the system. This log file may contain entries of operations performed from the time the database was created or from the time the database was last backed up until the present. The content and format of log entries depend on the design of the database system. Logically, each entry can be thought of as at least having (1) a transaction ID; (2) a unique record ID ("UID");and (3) an operation description (such as "insert," "update," etc.). A UID is any ID the logging subsystem uses to uniquely identify a database record. Many database systems also have an internal record ID that the DBMS uses for efficiency purposes. These record IDs are often the addresses of records in some level of storage abstraction. The UID need not be the same and is often different from the record ID in the system. One example of a UID is to use a combination of the primary key-value and the table ID of the record.

With the increasing emphasis in the database community on historical data, online analysis processing (OLAP), data warehousing, and data marts, it is crucial to propagate transactions performed on or changes made to an operation site database system (called the "operation site" or "local site") to another database system (called the "warehouse site" or "remote site") where analysis and decision support computation are performed. Other purposes, such as archiving or history analysis, may also require the propagation of changes in the operation site to the warehouse site. In these scenarios, the changes made to the database are captured through the log files of the operation site before the change-information is propagated to the warehouse site.

To propagate changes made on an operation site, it is first necessary to reconstruct a coherent view of the changes from the information available in its log files. This reconstruction results in an "equivalent global log file" which can apply the changes to remote copies of the same database. A log file that is "equivalent" to log file L is a sequence of log entries that, after applying the operations of the sequence to a copy of the database in the starting state of L, will bring the copy to the ending state of L.

For serial database systems, the order of operations can easily be inferred by examining the log files for each transaction; creating a global log file in that case is trivial. However, in parallel or distributed database systems, which consist of nodes each of which performs a part of a transaction, creating a global log file is much more complex.

In such systems, after all the nodes have finished processing their parts of the transaction, the results are put together to complete the transaction. Each node has its own log file associated with it, often called a "local log file," in which all of the operations performed by the node are recorded in the order completed. On a "share-nothing" model of a parallel or distributed database system, each node operates on a partition of the database; the problem of constructing a global transaction order is especially complex in this case because any data item in the database belongs to exactly one partition and thus to exactly one node. FIG. 1 depicts the architecture of a share-nothing parallel database system in which the network 9 is made up of processing nodes 1,2,3,4 each respectively associated with partitions 5,6,7,8. Parallel and distributed database systems are designed in such a way that application programs and end users need not be aware of the parallel or distributed architectures and data partitioning in the systems.

Reconstructing parallel or distributed database system log files into a global equivalent log file requires merging the entries of the local log files of all nodes in the system. If information for a total order of all log entries is recorded in the log files, the problem is trivial. However, this information is often unavailable. Modifying the logging subsystem to record this information in the log files may not be feasible because of efficiency, cost, backward compatibility, and other practical reasons. Even when this ordering information is available, determining the actual order of log entries from the information can be expensive when the number of logs is large.

The problem can be broken down into two parts—ordering of transactions and ordering of entries within each transaction. If two log entries belong to different transactions, they are arranged in the same order as their enclosing transactions. The order of transactions can be determined by examining a virtual timestamp or some other mechanism. For systems without virtual timestamps or other mechanism to establish order between two transactions, they may be arranged using a transaction-ordering mechanism as described in a co-pending application entitled "Constructing a Transaction Serialization Order Based on Parallel or Distributed Database Log Files," U.S. Application Ser. No. 08/871,001, filed Jun. 6, 1997.

Once the transaction order is known, it is necessary to order entries within each transaction. If two log entries belong to the same transaction and to the same local log, they can be arranged in the same order as they appear in the local log. The solution to this is trivial. However, the situation in which the two log entries belong to the same transaction but to different log files is not trivial and must be treated differently. And the problem of finding an equivalent log for a coherent log set can be considerably complicated when the two log entries have the same UID, i.e. they operate on the same record. This is possible because of "intra-transaction tuple migration" (a "tuple" is another word for a record), a phenomenon that occurs when within a transaction, a UID disappears from one node and reappears at another node, either because of "cross-node intra-transaction UID recycling" or because of "intra-transaction partition redistribution." Generally, "intra-transaction UID recycling" occurs when a transaction deletes a record of some UID and then inserts another record with the same UID. More specifically, "cross-node intra-transaction UID recycling" occurs when the "delete" and the "insert" occur on different nodes. "Intra-transaction partition redistribution" occurs after a number of insert and delete operations have been executed to the table resulting in uneven partition sizes. "Redistribution" rearranges the records to even out the partition sizes. When redistribution is encapsulated as a dedicated transaction, it is clean in concept and easy to handle. However, including redistribution as part of an ordinary transaction may be useful for transactions that insert or delete a very large number of records. It is in these cases that "intra-transaction partition redistribution" occurs.

Up to now, there has been no method for ordering entries belonging to the same transactions but to different nodes. It is the object of the present invention to develop a method that merges the local log files into a coherent, equivalent global log file that overcomes the aforementioned difficulties without imposing any additional requirements on the logging subsystem.

SUMMARY OF THE INVENTION

The present invention constructs a global log file by taking each local log file and extracting from it "UID-sequences," lists of log entries associated with particular UIDs. These UID-sequences are broken into "UID-segments," segments containing varying numbers of log operations. The properties of these UID-segments allow many of them to be discarded or shortened, and then the remaining UID-segments are put back into a sequence.

The present invention can operate on several levels of efficiency, whereby there is a trade-off between the length of the global log file and the work needed to create it. In the basic transformation, called a "Level 1 Transformation," UID-segments are discarded and some are shortened, creating the global log file. A "Level 2 Transformation" contains the same number of UID-segments as the Level 1 transformation, but shortens the remaining segments considerably which results in a shorter global log file. Finally, whereas Levels 1 and 2 operate solely on operations from the same transaction, a "Level 3 Transformation" takes operations from adjacent transactions (assuming their transaction order is known), treats them as one transaction, and performs either a Level 1 or a Level 2 transformation on the resulting pseudo-transaction. Level 3 results in a global log file that contains fewer segments than either the Level 1 or Level 2 transformations acting on single transactions.

The present invention is developed to work on database systems without instant constraint checks as well in the more complex situation when such constraint checks are active. The first kind of systems allows various constraint checking, primarily unique-key checks and referential constraint checks (also called foreign-key checks), to be turned off when applying entries of the equivalent log file (or any log file) to the remote system. It is impossible to do so with the second kind of systems. These constraints dictate the order in which different records may be operated upon and were followed when the log files were originally created at the operation site.

Thus, in the case of ordering entries on different nodes that act on different records, in the situation without instant constraint checks, the shortened UID-sequences can be ordered arbitrarily by record, whereas in the situation with instant constraint checks, operations on shortened UID-sequences must be ordered abiding by those constraints. In the counterpart case of ordering entries on different nodes that act on the same record, the situation without instant constraint checks constitutes the bulk of the solution and the situation with instant constraint checks must still be considered somewhat, but is not as important.

The present invention introduces and develops several key concepts. First is the UID-sequences and UID-segments. There are four main types of segments: "backward-open," "forward-open," "closed," and "double-open." Second is the use in Level 2 transformations of "superposition," both "backward" and "forward," and its related concept of "projected record images," to further compress all the operations in the UID-segments into one comprehensive operation. Third is the treatment of multiple adjacent transactions in Level 3 transformations as one transaction to which may be applied Level 1 or Level 2 transformations, and the concomitant development of "virtual closed segments." Fourth is the concept of life-spans of key-values in each record. These life-spans operate in systems with instant constraint checks and exist within the UID-segments. Fifth, also in systems with instant constraint checks, is the identification and resolution of constraint conflicts when ordering updates from different records. Sixth, and related to the previous concepts, is a way to identify and resolve value-switching and superposition conflicts between updates that have been superposed.

Using these concepts in different configurations transforms log files in such a way that the result of the transformation (1) contains fewer entries to be merged than were contained in the original log files; (2) contains only entries that are very easily ordered and merged; and (3) produces a merged log file that costs less to be transmitted and applied to the warehouse site than the sum of the original log files.

In actual implementations, the transformation and merging processes can be performed simultaneously in the same pass. For clarity however, these will be discussed as logically separate steps. In addition, the analysis and method apply to both distributed and parallel database systems; however, to facilitate presentation, parallel database systems are used as the example context for the rest of this disclosure. The methods and concepts listed above, as well as other improvements, are set forth in the following detailed description.

BRIEF DESCRIPTION OF THE DRAWINGS

FIG. 6 is a comprehensive flow chart showing the steps of the Level 2 and 3 transformations in database systems with instant constraint checks;

FIG. 9 is a flow chart showing the steps of identifying and resolving a foreign-key conflict in transformations in database systems with instant constraint checks;

DETAILED DESCRIPTION OF THE INVENTION

Description of this invention is made easier by first discussing database systems without instant constraint checks and then discussing systems with instant constraint checks (and describing what those constraints are). In some cases, the same process steps are used for both types of systems; these instances will be pointed out as necessary.

Database Systems Without Instant Constraint Checks

The present invention orders log files where the log entries (or equivalently, for current purposes, "operations") relate to the same transaction but appear on different nodes. When there are no instant constraint checks, ordering log entries belonging to different records is immaterial because there are no restrictions as to how specific records must be ordered (this is the domain of the constraints in systems with instant constraint checks). Thus, in a system without instant constraint checks, the present invention is only concerned with ordering entries from the same transaction and the same record (i.e. entries having the same transaction ID and the same UID), but that appear in different local log files.

Figure 1:
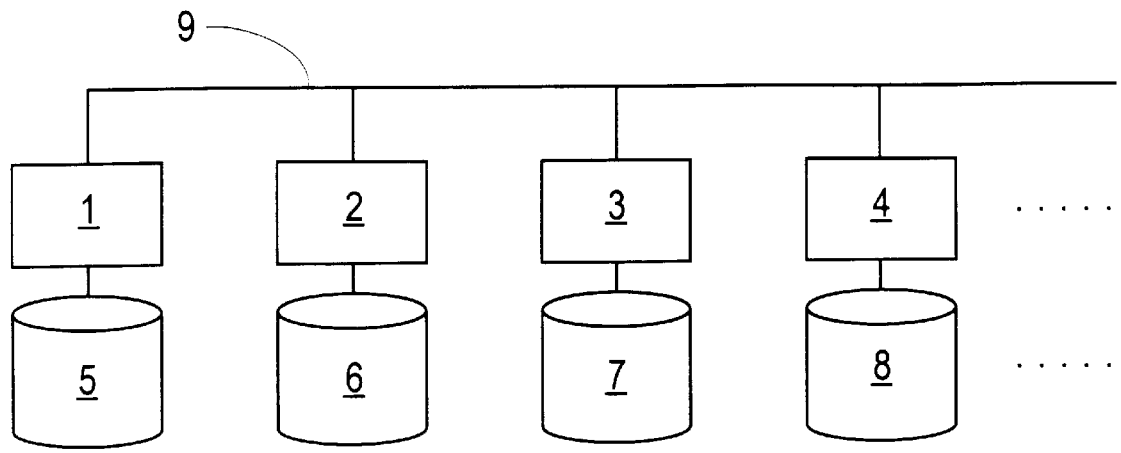
FIG. 1 shows the architecture of a share-nothing parallel database system.
Figure 2:
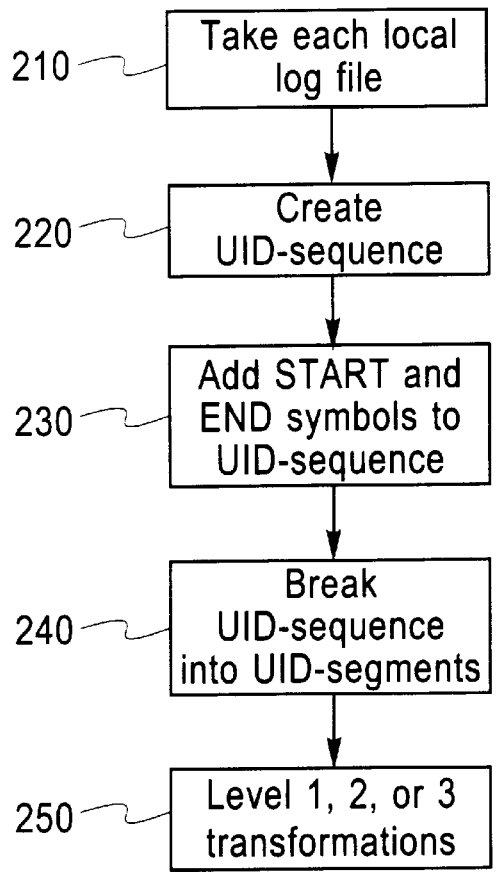
FIG. 2 is a flow chart showing the preliminary treatment of the log files before being subjected to the transformations.

FIG. 2 is a flow chart showing the preliminary steps taken to transform the log files into a global log file (these preliminaries also apply to systems with instant constraint checks). The first step 210 takes each local log file, one at a time. For each local log file and each UID, a "UID-sequence" is created in step 220 by extracting into a sequence all entries from that log file with that UID. Step 230 adds a START symbol to the beginning of the sequence and an END symbol to the end. Both START and END are logical symbols introduced for ease of discussion and need not correspond to physical log file entries. Thus, a UID-sequence begins with a START symbol, includes some arrangement of insert, delete, and update operations, and ends with an END symbol. Next, step 240 breaks each UID-sequence into "UID-segments" by traversing the UID-sequence and breaking it after every delete operation and before every insert operation. Thus, each UID-sequence will be a concatenation of the following types of segments:

1. A START symbol followed by one or more updates followed by an END symbol.
2. A START symbol followed by zero or more updates followed by a delete operation.
3. A START symbol by itself.
4. An insert operation followed by zero or more updates followed by a delete operation.
5. An insert operation followed by one or more updates followed by an EAD symbol.
6. An EAD symbol by itself.

The operations in these segments can be represented as follows to simplify the discussion. The notation for a log entry or an operation is op (node, UID, [att=value], . . . )

where op is an operation type, node is the node on which the operation is invoked, UID is the operand UID, and att=value denotes "attribute value" and contains information about other operands of the operation. In actual log files the node information is usually not recorded. However, it can easily be derived by examining from which local log file the entry comes. Operation types include ins, del, and up, denoting insert, delete, and update operations, respectively. For example, ins $(n_1, r_1, f_1=v_1)$ denotes an insert on node $n_1$ where the created record has UID $r_1$ and the value of field $f_1$ is $v_1$. For an update, att=b_{value→a_{value denotes an updated field whose value before the update operation (its "before-image") is b_{value and whose value after the update operation (its "after-image") is a_{value. (For simplicity, when the discussion does not require such information, the node, UID, and/or the attribute-value fields will be left out of the notation.) In addition, op* denotes a sequence of zero or more operations of type op, and op1 $(n_x)$–op2$(n_y)$ denotes that operation op1 on node $n_x$ precedes operation op2 on node $n_y$, and there could be zero, one, or more operations in between the two operations.

Thus, the types of UID-segments in each UID-sequence can be rewritten as follows:

1. START-up-up*-END (double-open)
2. START-up*-del (backward-open)
3. START
4. ins-up*-del (closed)
5. ins-up*-END (forward-open)
6. END Equivalently, an insert operation can be considered as starting a segment, and a delete operation as ending a segment. Segment 4, delimited by an insert and a delete, is called a "closed segment." A segment that starts with a START symbol, such as Segments 1 and 2, is called a "backward-open segment," and a segment that ends with an END symbol, such as Segments 1 and 5, is called a "forward-open segment." Segment 1, START-up-up*-END, is both a backward-open and a forward-open segment and is called a "double-open segment." Thus because there is only one START and one END for each UID-sequence, every sequence contains either one double-open segment by itself or it starts with zero or one backward-open segments, followed by zero or more closed segments, and ends with zero or one forward-open segments. Segments consisting only of START or END are considered "empty" as they do not contain any actual operation.

In a parallel database system, when the same UID appears in more than one UID-sequence extracted from the local log files, the UID-segments and sequences from the group of local log files have the following properties. First, only one UID-sequence contains START-up-up*-END or START-up*-del, that is, there is only one UID-sequence with a non-empty backward-open segment. If this were not so, there would be two records on two different nodes with the same UID at the time the log file starts. Second, only one UID-sequence contains START-up-up*-END or ins-up*-END, that is, there is only one UID-sequence with a non-empty forward-open segment. If this were not so, there would be two records on two different nodes with the same UID at the time the log file ends.

With these preliminaries performed, step 250 leads to the three different transformations that are at the heart of the present invention.

Figure 3A:
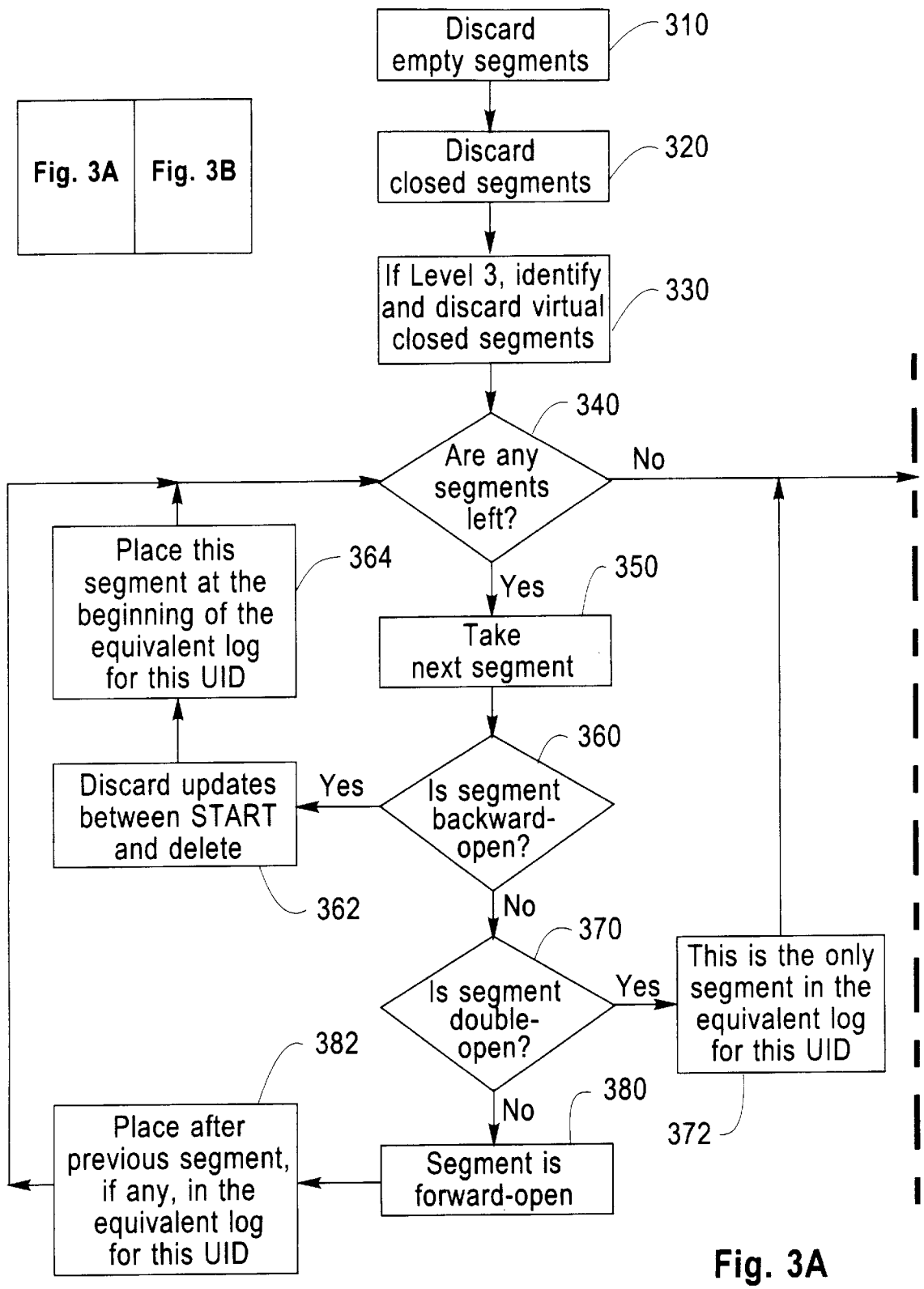
FIG. 3 is a comprehensive flow chart showing the steps of the Level 1, 2, and 3 transformations in database systems without instant constraint checks.

FIG. 3 is a comprehensive flow chart showing the steps of the Level 1, 2, and 3 transformations in database systems without instant constraint checks. An equivalent log file can be constructed by transforming the UID-sequences extracted from the local log files. First, step 310 discards the empty segments, i.e. the START and the END symbols. Next, step 320 discards the closed segments, ins-up*-del. The next step 330 involves Level 3 transformations and will be discussed later. For the reasons just discussed above, after this purging at most only two segments remain from all the local log files for each UID. The remaining segments can be one double-open segment only, one backward-open segment only, one forward-open segment only, or both a backward-open and a forward-open segment only. When only one segment remains for a particular UID, that segment is placed in the equivalent log file. When two segments remain, they must be a backward-open and a forward-open, and the backward-open segment is placed before the forward-open segment. In any case, whenever a backward-open segment remains, the segment may be shortened by discarding the update operations between the START symbol and the del.

This is called the Level 1 transformation, and the flow chart in FIG. 3 describes how it is implemented. After the empty segments and closed segments are discarded, the process enters a loop. Step 340 asks whether any segments remain to be placed in the equivalent log file. As was said before, there can be at most two segments left. Step 350 takes the next segment. If it is a backward-open segment, step 360 returns "YES," step 362 shortens the segment by discarding the updates between the START symbol and the del operation, step 364 places the backward-open segment at the beginning of the equivalent log file for this UID, and the loop returns to step 340 to look for more segments. (Because there are no constraint checks, the order of the UIDs with respect to each other does not matter, so the segments in the equivalent log file for the current UID can be arbitrarily placed.) If step 360 returns "NO," step 370 asks whether the segment is double-open. If so, step 372 says this is the only segment for this UID and it is placed anywhere in the equivalent log file. If not, step 380 says this segment must be a forward-open segment and step 382 places the segment after the previous segment, if there is one. Thus, step 382 places a forward-open segment after a backward-open segment if it remains; if a backward-open segment does not remain, or if it has not yet been picked up by steps 340 and 350, the forward-open segment can go anywhere into the equivalent log file. If the backward-open segment is then picked up, step 364 places it at the beginning of the equivalent log file for this UID, i.e. before the forward-open segment that was just placed.

The result of a Level 1 transformation, for each UID across all the local log files, is that there can be at most one delete operation (from the backward-open segment) and one insert operation (from the forward-open segment), and, if both operations exist, the delete operation precedes the insert operation. If the forward-open segment remains, there will also be zero or more update operations remaining. If only the double-open segment remains, only a number (at least one) of update operations exist. Thus from all the operations on all the local log files for each UID, the Level 1 transformation reduces them to one of the following:

1. START-up-up*-END (double-open)
2. START-del (backward-open)
3. ins-up*-END (forward-open)
4. START-del-ins-up*-END (backward-open/forward-open)
5. [no segments remain]

The present invention continues and shortens the length of the equivalent log file with a Level 2 transformation. In this transformation, three types of compressions are performed that reduce the length of the segments remaining in the equivalent log file. First, if a delete operation is followed by an insert operation, the combination can be replaced by one update operation. Second, if an insert operation is followed by a series of update operations, all the operations can be replaced by one insert operation. Finally, any series of update operations can be replaced by one update operation.

The mechanism used to compress these operations is called "superposition." In order to understand superposition, it is necessary to preliminarily define two concepts: "record images" and "projected record images." A "record image" is an image of a database record, consisting of a sequence of fields, each field having a value of some type. A "projected record image" (or "image" for short) is a record image with certain record fields "blacked out," that is, the value of some fields are not visible to the user. A field whose value is not blacked out is said to be "present." For example, in some implementations of logging, the before- and after-images of updates contain only the fields that are changed. These before- and after-images can thus be modeled as projected record images. Another example of a projected record image is the "operand record image" (i.e. the values of all the fields of a record) of an insert operation, but in that case, all fields of the record image are present.

"Superposition" is a method that extracts a projected record image from a sequence of projected record images and can be described as being "forward" or "backward." Given a set of input projected record images of the same record, "backward superposition" produces another projected record image (called the "result image") (1) whose fields are present if and only if they are present in some input image; (2) the value of a field in the result image is the value of this field in the earliest ("oldest") image, if the field is present in more than one input image; and (3) if a field is present in only one input image, the value of this field in the result image is the value of this field in the input image. "Forward superposition" is defined similarly, except that the value of a field in the result image is the value of this field in the latest ("youngest") image, if the field is present in more than one input image.

Figure 4:
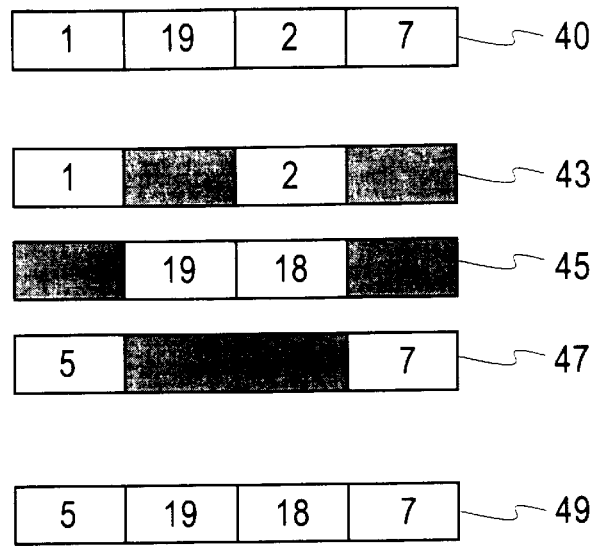
FIG. 4 illustrates the concepts of forward and backward superposition.

Backward and forward superposition are illustrated in FIG. 4. There are three input projected record images, 43, 45, 47, each with four integer fields. The output of backward superposition is record image 40 and the output of forward superposition is record image 49. In backward superposition, the value of the first field is 1 and the value of the third field is 2 because those are the values of the fields in the oldest image 43. The value of the second field is 19 and the value of the fourth field is 7 because those are the only values of the fields present in the input images 43, 45, 47. Similarly, in forward superposition, the value of the first field is 5 and the value of the third field is 18 because those are the values of the fields in the youngest image 47. The value of the second field is 19 and the value of the fourth field is 7 because those are the only values of the fields present in the input images 43, 45, 47.

The Level 2 transformation is also contained in FIG. 3. After placing the remaining UID-segments in the equivalent log file, step 390 asks whether Level 2 is active. If not, the comprehensive process ends in step 399 with the results of the Level 1 transformation. However, for only a little more work on Level 2, the equivalent log file can be greatly shortened. If Level 2 is active, step 392 replaces any delete operation followed by an insert operation with an update operation whose before-image is the before-image of the delete operation, and whose after-image is the operand record image of the insert operation. After this, step 394 replaces an insert operation followed by any number of update operations into one superposed insert operation. The operand record image of this superposed insert operation is the forward superposition of the operand record image of the original insert operation and the after-images of all of the update operations. Finally, step 396 replaces any series of update operations by one superposed update operation whose before-image is the backward superposition of all before-images of the update operations, and whose after-image is the forward superposition of all after-images of the update operations.

These three steps 392, 394, 396 can operate in any order depending on how the equivalent log file is considered: as a series of operations or as a concatenation of the segments enclosing those operations. In the former case, if a backward-open and a forward-open segment remain after Level 1 transformation, the log file contains START-del-ins-up*-END. Step 392 replaces the delete operation and the insert operation with an update operation, leaving START-up-up*-END. Step 396 superposes the update operations into one update operation leaving START-up-END. Alternatively, the START-del-ins-up*-END could be considered just as a backward-open segment START-del and a forward-open segment ins-up*-END. In that case, in the forward-open segment, step 394 superposes the insert operation and the update operations to one insert operation resulting in ins-END. When combined with the backward-open segment, step 392 replaces the delete operation and the insert operation with an update operation, leaving START-up-END, the same result as before. (Note that this result, START-up-END, is the same result if only a double-open segment remained in the equivalent log file.)

Thus, after a Level 2 transformation, there remains only one operation for each UID across all the log files, as is shown in the following table:

| UID-segment | Level 1 Result | Level 2 Result |
| --- | --- | --- |
| double-open | START-up-up*-END | START-up-END |
| backward-open | START-del | START-del |
| forward-open | ins-up*-END | ins-END |
| backward-open/ forward-open | START-del-ins-up*-END | START-up-END |

The equivalent log file produced by a Level 2 transformation has the same properties as those possessed by a Level 1 transformation. However, a Level 2 transformation produces a shorter equivalent log file and is likely to run faster than a Level 1 transformation. A Level 2 transformation is also crucial in ordering operations with different UIDs on systems with instant constraint checks (considered later).

In the previous discussion, Level 1 and Level 2 transformations are applied to log entries from the same transaction. There is no intrinsic limitation to use the transaction as the scope of these transformations. If preserving the original transaction boundaries is not important for an application, adjacent transactions can be "coalesced," that is, multiple adjacent transactions can be treated as one pseudo-transaction, and the Level 1 and 2 transformations applied to the large pseudo-transaction. This is called the "Level 3" transformation. A Level 3 transformation can result in a very short equivalent log file, which can be used to update remote copies of the database very efficiently.

When considering multiple transactions simultaneously, forward- and backward-open segments from different transactions can interact with each other, and the interaction of double-open segments with other segments becomes significant. Suppose that all segments from all transactions having the same UID are ordered according to the serialization order of the transactions (the order of the transactions in the global log file). For two adjacent transactions, $T_i$ and $T_j$, if the last segment F in $T_i$ is a forward-open segment, then the first segment B in $T_j$ must be either a backward-open or a double-open segment. If the first segment in $T_j$ is a backward-open segment, the two segments in effect make a closed segment. That is, because of the delete operation at the end of B, all other operations in F and B do not affect the final state of the database. Segments F and B are considered as "matching" each other and combine to form a "virtual closed segment." A forward-open or backward-open segment that does not have a matched segment is said to be "unmatched." Similarly, it is also possible for a forward-open segment, a backward-open segment, and several double-open segments in between, each of the segments from different transactions, to form a virtual closed segment.

Figure 5A:
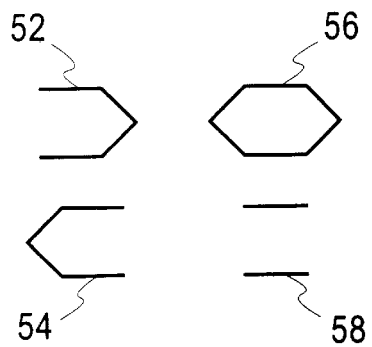
FIG. 5a shows representations of backward-open, forward-open, double-open, and closed segments, especially as used in Level 3 transformations.
Figure 5B:
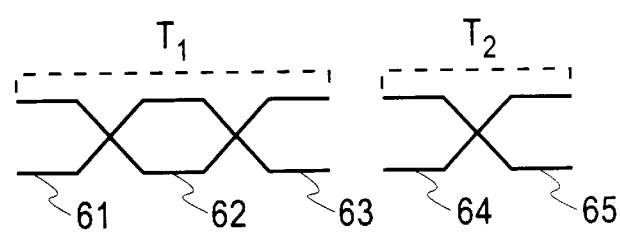
FIG. 5b shows an example of a virtual closed segment in a Level 3 transformation.
Figure 5C:
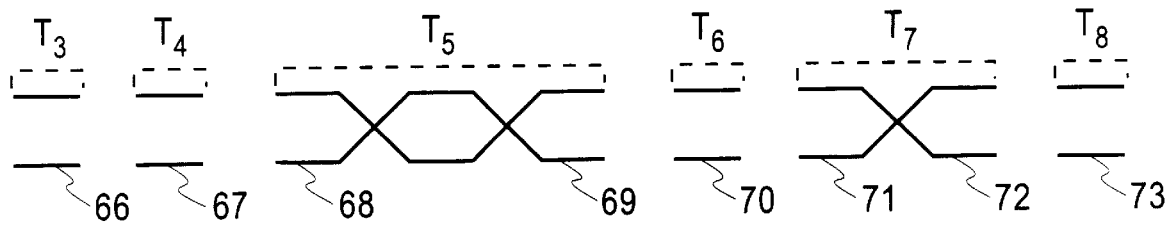
FIG. 5c shows a more complex example of virtual closed segments and interactions among segments in a Level 3 transformation.

FIGS. 5a, 5b, and 5c provide examples of these segments. FIG. 5a shows the different types of segments: a backward-open segment 52; a forward-open segment 54; a closed segment 56; and a double-open segment 58. In FIG. 5b, transaction $T_1$ includes backward-open segment 61, closed segment 62, and forward-open segment 63; transaction $T_2$ includes backward-open segment 64 and forward-open segment 65. The last segment of $T_1$ 63 and the first segment of $T_2$ 64 form a virtual closed segment. Neither of the operations of these two segments, except the final delete, can affect the final state of the database, and both segments can thus be excluded from the merged log file. FIG. 5c provides a more complex example. In this example, the last segment of $T_5$ 69, the double-open segment in $T_6$ 70, and the first segment of $T_7$ 71 form a virtual closed segment, and thus all three segments can be excluded from consideration when merging the log files.

FIG. 5c also illustrates the possible segments in a Level 3 transformation. Analogous to the UID-segments in a Level 1 or 2 transformation, the UID-segments in Level 3 are pseudo-backward-open, pseudo-double-open, pseudo-forward-open, and virtual closed. A pseudo-backward-open segment is a backward-open segment with one or more double-open segments before it. In FIG. 5c, double-open segment 67 from transaction $T_4$ in combination with backward-open segment 68 from $T_5$ forms a pseudo-backward-open segment. Because a double-open segment is made up of a series of update operations, START-up-up*-END, and a backward-open segment is made up of update operations followed by a delete operation, START-up*-del, the combination merely adds updates to the beginning of the backward-open segment and the structure remains START-up*-del. However, because the transformation discards the update operations from the backward-open segments, pseudo-backward-open segments are only useful for the delete operation and in the end have the same effect as a regular backward-open segment. Similarly, a pseudo-forward-open segment is a forward-open segment with one or more double-open segments after it. Double-open segment 73 from transaction $T_8$ in combination with forward-open segment 72 from $T_7$ forms a pseudo-forward-open segment. Again, the double-open segment at the end merely adds update operations to the end of the forward-open segment and the structure remains ins-up*-END. In contrast with the pseudo-backward-open segments, the double-open segments after the forward-open segment do matter and are not discarded. Similarly, putting multiple double-open segments together, segment 66 in $T_3$ and segment 67 in $T_4$, forms a pseudo-double-open segment consisting only of update operations, the same structure as a regular double-open segment.

Thus, when considering multiple transactions together, the pseudo-segments in a Level 3 transformation behave the same as the segments within the same transactions in Level 1 or 2 transformations. Therefore, virtual closed segments, like closed segments within the same transaction, can be excluded from consideration and discarded. Referring back to FIG. 3, step 330 includes the step of identifying and discarding virtual closed segments. Step 362 discards the update operations in a pseudo-backward-open segment. As before with the simple Level 1 transformation, very few segments remain: either a backward-open segment, a pseudo-forward-open segment, or a pseudo-double-open segment, each segment existing by itself, or a backward-open segment with a pseudo-forward-open segment, with the backward-open segment ordered before the pseudo-forward-open segment. The only difference is that the discrete segments that make up the pseudo-segments come from different transactions.

As with segments from the same transaction, the remaining pseudo-segments can be operated on by a Level 2 transformation. In that case, step 392 replaces the delete operation followed by an insert operation with an update operation; step 394 superposes the insert operation from a pseudo-forward open segment with the update operations following it into one superposed insert operation, and step 396 superposes any series of update operations into one superposed update operation. The equivalent log file in Level 3 is much shorter because it deletes operations across transaction borders, operations that remain after plain Level 1 or Level 2 transformations.

Database Systems With Instant Constraint Checks

These three transformations can also be used in systems with instant constraint checks, but the constraints have to be honored and checked in the process. The previous section described how to order operations with the same UID, without regard to how the system performs the constraint checks, and the order between operations on different UIDs is irrelevant. For systems with instant constraint checks, the relationships between operations with different UIDs becomes important.

There are four types of constraints that systems may check for: unique-key constraints, referential constraints, partition keys, and general multi-attribute constraints. Only the first two present problems and they will be discussed in detail; the latter two are briefly discussed at the end.

A unique-key constraint restricts a table in a database from having two records with the same unique-key value. A unique-key identifies a record uniquely such as in an employee table where each employee is identified by a social security number. No two records can have the same unique-key at the same time; however, if a record with a unique-key is deleted, that unique-key can be picked up by another record.

A referential constraint, also called, somewhat interchangeably, a "foreign-key" constraint, operates between tables restricting a field in one table to use values that are identified in another table. For example, an employee table may have a field called "department." If a referential constraint is active, there must be another table, a department table for example, having a field which must include as one of its values the name of the employee's department. The department table is called a "parent" table and the employee table is called a "child" table. The relationship between the two is not one-to-one—a table can be both a parent and a child with respect to different fields, and a table can have more than one parent or more than one child.

The purpose of imposing constraints is to have a database that makes sense. The constraints prevent nonsense data from being entered into it. The constraints are observed when the data are entered into the database; they must therefore be observed in constructing the global equivalent log file. Because of the care with which the equivalent log file is developed, this process is more expensive than in the situation without instant constraint checks, but it is needed because so many database systems incorporate constraints.

Just as UID-sequences and UID-segments were the backbone of the transformations in constructing an equivalent log file in systems without instant constraint checks, the present invention introduces the related concept of "life-spans" of attribute values of a record. An operation (insert, delete, or update) either brings an attribute value into existence on a particular node or destroys an attribute value from the node. The time in which an attribute value continuously resides on some record is called a "life span" of the attribute value. In terms of log entries, a "life span of an attribute value V" is defined as the sub-sequence of entries, within a larger sequence, starting with the entry in which attribute value V is created (by an insert or an update operation, called the "creator" operation) and ending with the entry with the same UID in which attribute value V is deleted (by a delete or an update operation, called the "destroyer" operation). "Life span" conceptualizes the continuous existence of an attribute value on a particular record. Since a record has a UID, a life span is considered as existing on a UID, too. Note that by definition the creator and the destroyer of a life span must have the same UID, and an update is simultaneously a destroyer and a creator (of different life spans). An attribute value can appear in more than one life span in a log file on the same or on different records.

Ordering unique-key related operations is simplified if it is considered in terms of the life spans of the unique-key values, a novel concept called "key-value life spans." A "key-value life span" is divided into those that are "closed," "backward-open," and "forward-open" with respect to a sequence of operations; a "closed life span" is a life span whose creator and destroyer operation are in the same sequence; a "backward-open life span" is a life span whose destroyer is in the log file, but whose creator is earlier than the start of the sequence; and a "forward-open life span" is a life span whose creator is in the sequence, and whose destroyer is later than the end of the sequence. From the definitions, it is apparent that in a sequence of operations there can only be one backward-open and one forward-open life span for each key-value. With regard to the order of log entries for all life spans for a key-value, the backward-open life span must be ordered before all other life spans and the forward-open life span must be ordered after all other life spans. The order of closed life spans with respect to each other does not affect the ending state of the database. Nor can the order be determined by looking at the log entries alone.

As could be discerned from the life span nomenclature, there is a connection between UID-segments and life spans. Life spans have several following properties with respect to UID-segments. First, a backward- (or forward-) open life span by definition must exist in a backward- (or forward-) open UID-segment because a key-value must exist on a record. The continuous existence of this record must cover the life span of the key-value. If a key-value is created before the first operation of a sequence of operations, than the record with that UID must be created before that, too. Thus a backward-open life span must exist in a backward-open UID-segment. Similar arguments apply to forward-open life spans. Second, any life span of a key-value must exist completely within a UID-segment. That is, the creator and the destroyer of a life span, if both exist, must belong to the same UID-segment.

The method of the present invention is applied to both unique-key constraints and referential constraints; referential constraints affect all three types of operations whereas unique-key constraints only affect update operations. As discussed above, for a unique-key constraint to be valid, a unique-key-value cannot exist on two records simultaneously at any time of the database history. To abide by this rule, all backward-open life spans must be ordered before all closed life spans, which in turn must be ordered before all forward-open life spans. For systems without instant constraint checks, the transformations ordered the backward-open UID-segment (including a double-open UID-segment) before the forward-open UID-segment for each set of UID-segments associated with a particular UID. When there are instant constraint checks, backward-open UID-segments are still ordered before all forward-open UID-segments, but in this case the method considers segments from different UIDs at the same time and the double-open segments must also be ordered. Because double-open segments are both backward- and forward-open, they are ordered between the purely backward-open and purely forward-open segments. This ordering guarantees that all backward-open life spans are ordered before all forward-open life spans.

If the unique-key constraints dictate the placement of the types of segments with respect to each other and the interaction of update operations among the different records, the referential constraints assure that within each of the types of segments, a referenced key-value (or "parent-key value") outlives any instance of the corresponding referencing key-value (or ("child-key value"). That is, the life span of a parent-key value must cover the life spans of all of its child-key value instances. For backward-open segments, this requires operations on a child field to be ordered before operations on a parent field. Conversely, for forward-open segments, this requires operations on a parent field to be ordered before operations on a child field.

It is possible to implement a Level 1 transformation in systems with constraint checks. As before, this would entail discarding the empty and the closed segments and ordering the backward-open segments first, the forward-open segments last, and the double-open segments in between. However, when constraint checks are active, each update operation in each segment must be compared with the previous updates already in the equivalent log file to make sure that no constraints are violated. Each double-open segment and each forward-open segment can contain many update operations. When compared with the result of a Level 2 transformation in which each segment contains only one operation, it can be seen that there is little benefit in performing the Level 1 transformation in these systems. Therefore, this description only discusses Level 2 and Level 3 transformations in systems with instant constraint checks.

FIG. 6 is a comprehensive flow chart showing the steps of the Level 2 and 3 transformations in database systems with instant constraint checks. This flow chart is somewhat similar in structure to that for systems without instant constraint checks (FIG. 3). As before, once the UID-sequences are created and broken into UID-segments, step 610 discards the empty segments and step 620 discards the closed segments. Again, segment 630 involves the Level 3 transformation and its discussion will be deferred. Abiding by the rule that backward-open segments are ordered first, forward-open segments last, and double-open segments in-between, the process uses three loops, first finding all of the backward-open segments, then all of the double-open segments, then all of the forward-open segments.

The first loop orders the backward-open segments. Step 640 looks for remaining backward-open segments. If any exist, step 642 takes one and shortens it by discarding the update operations within it, just as before. This leaves segments of START-del. On backward-open segments, only a referential constraint is important. Thus, step 644 asks whether a referential constraint is active. If it is, the referential constraint requires the segment being ordered to be placed in the equivalent log file before all of its parent segments and after all of its child segments, as shown in step 648. If the referential constraint is not active, the segment can be ordered anywhere amongst the backward-open segments. Thus step 646 places the current segment after the previous segment and the process returns to step 640 to retrieve the next backward-open segment, if any remain.

When all of the backward-open segments are ordered, step 640 returns "NO" and the process continues with the double-open segments. Step 660 begins the loop and asks whether there are any double-open segments remaining. Step 662 takes one of these segments and performs a superposition on the update operations such that all of the operations are superposed into one update operation. The result of this is the same as in systems without instant constraint checks: the superposed update operation has a before-image that is the backward superposition of all before-images of the update operations, and an after-image that is the forward superposition of all after-images of the update operations. Step 664 asks whether any updates have been placed in the equivalent log file yet. If not, step 666 places the update in the double-open segment after the last backward-open segment (there is no interaction between the double-open and backward-open segments). However, if other update operations are already in the equivalent log file, the process must check for both unique-key constraints and referential constraints. The present invention identifies conflicts between update operations and resolves those conflicts relating to both types of constraints.

There is a simple explanation as to why update operations may conflict. An update operation changes the values of some attributes from old values to new values. It necessarily both starts and ends the life spans for the attributes it touches. In other words, the life spans it ends are "glued" to the life spans it starts and cannot be separated. This makes it impossible to order all backward-open life spans before all closed life spans and then all forward-open life spans for some key-attribute, if more than one update is involved in the creation and destruction of the life spans. For example, consider two updates $U_1$ and $U_2$ which end life spans $L_{1a}$ and $L_{2a}$ and create life spans $L_{1b}$ and $L_{2b}$, respectively. If $U_1$ is ordered before $U_2$, $L_{2a}$ will overlap both $L_{1a}$ and $L_{1b}$. If $U_1$ is ordered after $U_2$, then $L_{1a}$ will overlap both $L_{2a}$ and $L_{2b}$. It is impossible to achieve a disjoint ordering of, say, $L_{1a}$-$L_{2a}$-$L_{1b}$-$L_{2b}$. Thus another mechanism must be used to order updates.

The present invention contemplates ordering a set of updates of the same record type in which the current update $U_1$ is ordered after a sequence of updates S. Step 668 consists of several subprocesses that must be performed to ensure no constraint violations.

Figure 7:
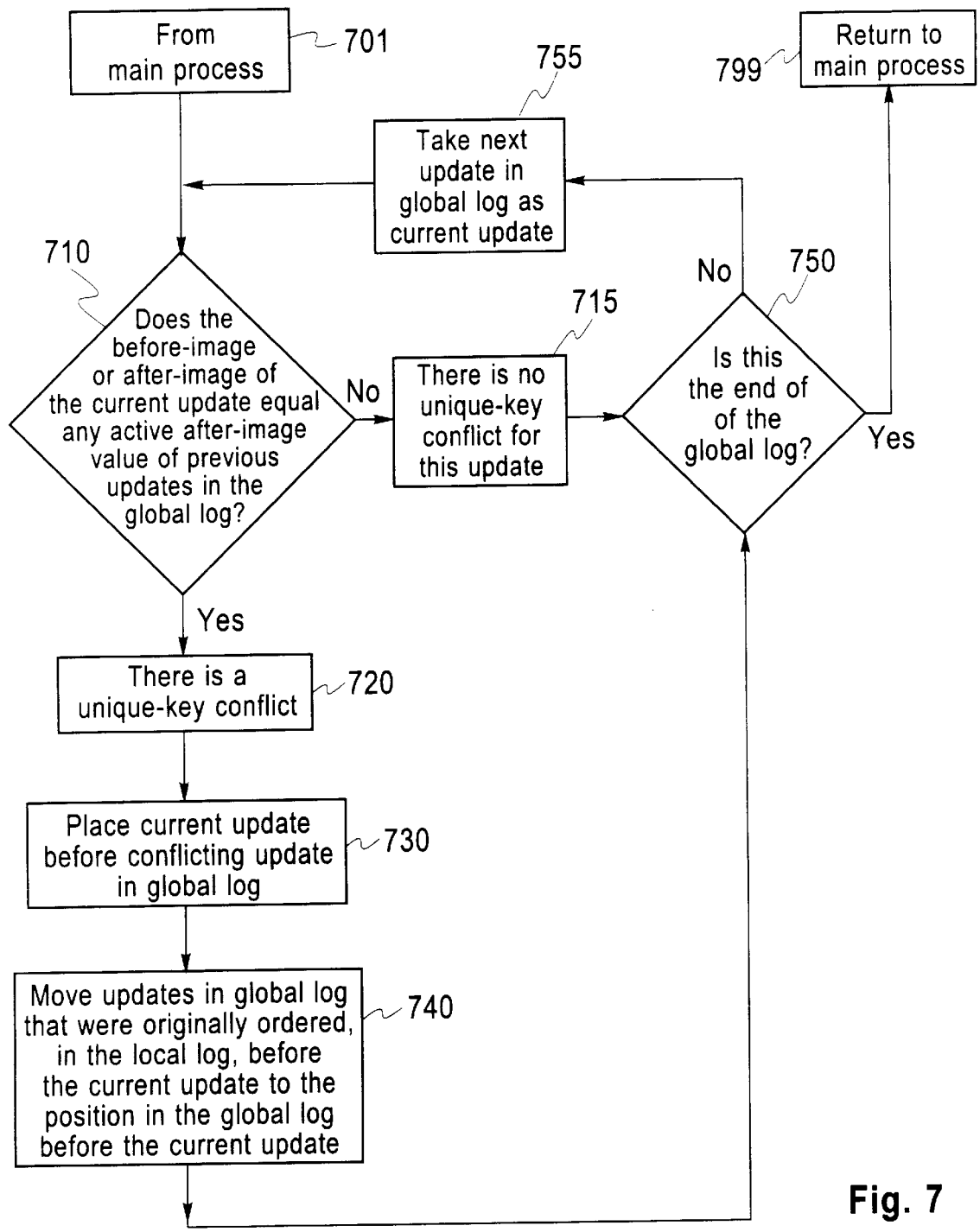
FIG. 7 is a flow chart showing the steps of identifying and resolving a unique-key conflict in transformations in database systems with instant constraint checks.

A unique-key constraint is violated if the values in both the before-image and the after-image of update $U_1$ appear in any "active after-image value" of the updates in the sequence S. An "after-image value" is "active" if it is not masked by some later updates on the same UID. The subprocess that identifies and resolves unique-key conflicts is described in FIG. 7. Step 701 denotes the place of departure from the main process of FIG. 6. Step 710 performs a "unique-key check" asking whether either the before-image or the after-image of the current update $U_1$ equals any active after-image value of the updates in the sequence S. If the answer to this check is "NO," step 715 explains that there is no unique-key conflict for this update. However, if step 710 returns "YES," step 720 explains that there is a unique-key conflict. In such a case, step 730 places the current update $U_1$ before the conflicting update in the equivalent log file. However, because the order of updates in each local log file must be preserved in the equivalent log file, step 740 moves the updates that were ordered before the current update in the original local log file to the position before the current update. Finally, because these updates were moved, it may have created other conflicts. The process must check for unique-key conflicts and repeat the steps again starting with the update after the conflicting update, if any. This last step is reflected in the flow chart by steps 750 and 755. If this is not the end of the global log file, step 755 takes the next update in the global log file as the current update, and the unique-key check in step 710 is performed. If this is the end of global log file, step 750 returns "YES" and step 799 returns to the main process in FIG. 6 to step 668.

The next subprocess identifies and resolves value-switching conflicts that may occur as a result of superposition. In such a case, a group of updates on two or more records may have the net effect of switching their values on some fields. A value-switching conflict occurs when given two or more updates involving these records, there is no way to order them without violating the unique-key constraints. For example, the following updates $up\ (r_1, u_k = v_1 \to v_2)$ (update the record whose $UID = r_1$, where the value of the unique-key field goes from $v_1$ to $v_2$)

$up\ (r_2, u_k = v_3 \to v_1)$ (update the record whose $UID = r_2$, where the value of the unique-key field goes from $v_3$ to $v_1$)

$up\ (r_1, u_k = v_2 \to v_3)$ (update the record whose $UID = r_1$, where the value of the unique-key field goes from $v_2$ to $v_3$)

switch the value of $r_1$ and $r_2$ on field $u_k$. If the previous superposition mechanisms are applied to these updates, two updates result:

up $(r_1, u_k = v_1 \to v_3)$
up $(r_2, u_k = v_3 \to v_1)$

No matter how these two updates are ordered, unique-key constraints are violated. Another example demonstrates the value-switching conflict involving more than two records. Consider the following updates:

up $(p_1, u_k = v_2 \to v_1)$
up $(p_2, u_k = v_3 \to v_2)$
up $(p_3, u_k = v_4 \to v_3)$
up $(p_1, u_k = v_1 \to v_4)$

After superposition, three updates result:

up $(p_1, u_k = v_2 \to v_4)$
up $(p_2, u_k = v_3 \to v_2)$
up $(p_3, u_k = v_4 \to v_3)$

Again, no matter how these updates are ordered, the unique-key constraints are violated.

Figure 8B:
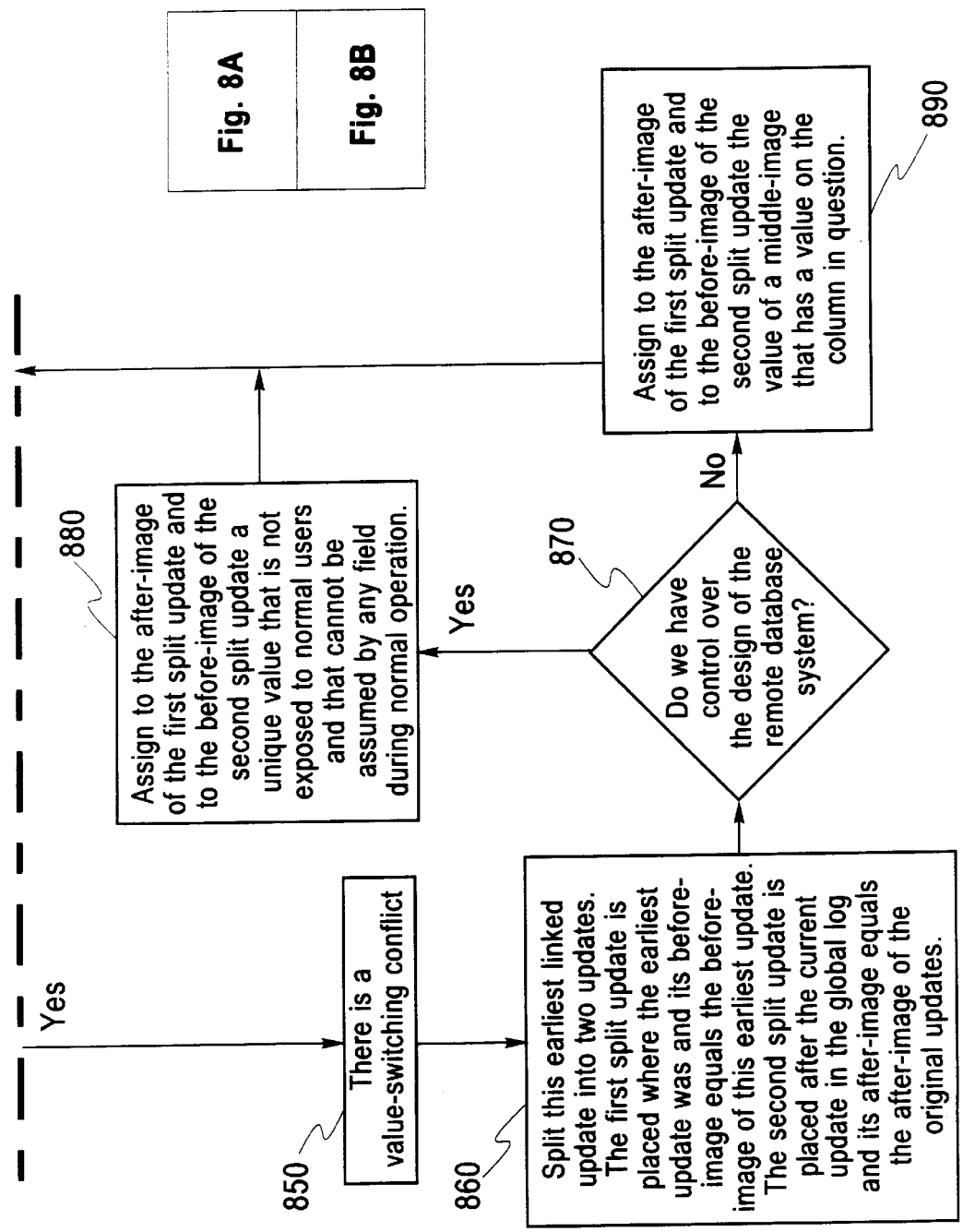
FIG. 8 is a flow chart showing the steps of identifying and resolving a value-switching conflict in transformations in database systems with instant unique-key constraint checks.

The present invention identifies these violations and resolves them. The subprocess is described in FIG. 8; we will use the three updates in the last example above to illustrate the subprocess. Assume the current update is the update on $p_1$, and the updates on $p_2$ and $p_3$ already exist in the equivalent log file. Step 810 asks whether the after-image of the current update is the same as the before-image of any update appearing earlier in the global log file. If not, step 815 explains there is no value-switching conflict and the subprocess ends at step 899 and returns to the main process in FIG. 6. If step 810 returns "YES," step 820 makes a link from the current update to those earlier updates whose before-images equal the after-image of the current update. In this example, the after-image of $p_1$ is $v_4$ which is the same as the before-image of $p_3$. Thus, a link is made from $p_1$ to $p_3$. Step 830 follows the links from the current update to the earliest update in the links. In this example, a link already exists from $p_3$ to $p_2$ because the after-image of $p_3$ is the same as the before-image of $p_2$ (this link was made when $p_2$ was placed in the equivalent log file), and following the links from $p_1$ to $p_3$ and from $p_3$ to $p_2$ ends at $p_2$, i.e. $p_2$ is the earliest update in the links. Step 840 then asks whether the before-image of the current update is the same as the after-image of this earliest update. If the answer is "NO," step 845 explains that there is no value-switching conflict and the subprocess returns to the main process. If the answer is yes, step 850 explains that there is a value-switching conflict. In this example, because the before-image of the current update $p_1$ equals the after-image of the earliest linked update $p_2$ (the value is $V_2$), there is a value-switching conflict.

The subprocess continues by resolving the conflict. Step 860 splits this earliest linked update into two updates. The first split update has the same before-image as the earliest update had before the split, and the split update stays at the head of the links where the earliest update had been placed. The second split update has the same after-image as the original updates, and is placed at the end of the links after the current update. In our example, the first split update is placed where update $p_2$ was and its before-image equals $v_3$. The second split update is placed after $p_1$ and its after-image equals $v_4$.

Now all that is left is assignment of values to the after-image of the first split update and the before-image of the second split update. Two schemes are proposed to solve this problem—which one is used depends on whether we have control over the design of the remote database system, the question asked in step 870. If so, step 880 assigns to the after-image of the first split update and to the before-image of the second split update a unique value that is reserved by the system and that is not exposed to normal users and cannot be assumed by any field during normal operation. This value is used only during propagation of changes from database to database, and is assigned to the vacant images of the split updates. This value could be something like 99999. If step 870 returns "NO," step 890 assigns to the after-image of the first split update and to the before-image of the second split update the value of a middle-image that has a value on the column in question. A "middle-image" is an image resulting during superposition when an update operation modifies a unique-key. Generally middle-images are thrown away after superposition if no value switching conflict is detected. The first scheme in step 880 is likely to be more efficient, but its use depends on who has control over the design of the remote database system. In our example, following step 880 might add the number 99999 to the missing split update images. Following step 890 might use the value $v_1$ which was a middle-image. The overall effect of this subprocess on the three updates listed above is to create a fourth update operation.

When the value-switching conflict identification and resolution subprocess ends in step 899, the user returns to the main process in step 668. The next subprocess involves referential (or foreign-key) constraint checks. The subprocesses for the referential constraints are similar in structure to those for the unique-key constraints, except that the subprocesses look for conflicts among updates that are parents or children of each other.

A referential constraint check involves checking the fields of the records involved in the referential constraint. Such a constraint is violated if (1) in the case where a child update is placed after a parent update, the before-image of the child update is the same as the before-image of the parent update; or (2) in the case where a parent update is placed after a child update, the after-image of the parent update is the same as the after-image of the child update.

The referential constraint subprocess that identifies and resolves referential or foreign-key conflicts is described in FIG. 9 and requires the referential constraints in the system to be cycle-less either at the table level or at the column level. The structure of this subprocess differs slightly from that of the unique-key check because an update can be both a child and a parent of different fields at the same time; the subprocess treats the two cases slightly differently. Step 901 denotes the place of departure from the main process of FIG. 6. Step 910 asks whether the current update is a child of any of the previous updates in the equivalent log file. If not, then the subprocess continues to step 950 to see if the current update is a parent of any of the previous updates in the equivalent log file. If step 910 returns "YES," step 920 performs a "foreign-key check" and asks whether the before-image of the current update equals the before-image of any of the parent updates before it in the equivalent log file. (The words "foreign-key check" and "foreign-key conflict" are used in this context instead of "referential constraint check" (or "conflict")because those names serve as more of a parallel to the "unique-key check" and "unique-key conflict" labels.) If the answer to this check is "NO," step 925 explains that there is no foreign-key conflict between this child update and any of its parent updates and the process continues to step 950. However, if step 920 returns "YES," step 930 explains that there is a foreign-key conflict, and the current update is placed before the conflicting parent update in the equivalent log file. However, as with the unique-key conflict resolution, because the order of updates in each local log file must be preserved in the equivalent log file, step 940 moves the updates that were ordered before the current update in the original local log file to the position before the current update.

Next, because of superposition of updates, it is possible that there is a superposition conflict analogous to the value-switching conflict identified with respect to unique-key constraints. However, in order to better understand the superposition conflicts, discussion of this is deferred until after the referential constraints between the current update and its parents are checked.

After step 945 returns from the superposition conflict subprocess, step 950 asks whether the current update is a parent of any of the previous updates in the equivalent log file. If not, step 955 explains that there are no more foreign-key conflicts for this current update and the subprocess continues to step 990. If step 950 returns "YES," step 960 performs the foreign-key check asking this time if the after-image of the current update equals the after-image of any of its child updates. If not, then step 965 explains that there is no foreign-key conflict between this current parent update and the child updates before it in the log file, and the subprocess continues with step 990. If step 960 returns "YES," there is a foreign-key conflict and step 970 places the current update before the conflicting child update in the equivalent log file. Again, the updates that come from the same local log file as the current update still have to be ordered before the current update, and step 980 moves the updates that were ordered before the current update in the original local log file to the position before the current update.

This brings us to step 985 and the superposition subprocess. The superposition problem is illustrated by the following example. Consider the following valid operation sequence (where c denotes child records and p denotes parent records):

$ins\ (p_1, p_k = v_1)$ (insert into the record whose $UID = p_1$, where the value of the parent-key field equals $v_1$)

$ins\ (p_2, p_k = v_3)$ (insert into the record whose $UID = p_2$, where the value of the parent-key field equals $v_3$)

$ins\ (c_1, c_k = v_1)$ (insert into the record whose $UID = c_1$, where the value of the child-key field equals $v_1$)

$up\ (c_1, c_k = v_1 \rightarrow v_3)$ (update the record whose $UID = c_1$, where the value of the child-key field goes from $v_1$ to $v_3$)

$up\ (p_2, p_k = v_1 \rightarrow v_2)$ (update the record whose $UID = p_1$, where the value of the parent-key field goes from $v_1$ to $v_2$)

$up\ (c_1, c_k = v_3 \rightarrow v_2)$ (update the record whose $UID = c_1$, where the value of the child-key field goes from $v_3$ to $v_2$)

After performing superposition, only two updates remain:
up $(c_1, c_k = v_1 \rightarrow v_2)$
up $(p_1, p_k = v_1 \rightarrow v_2)$
No matter how the operations are ordered, the referential constraint is violated because both the before-image and the after-image of the updates are equal.

Steps 945 and 985 denote the departure from the main subprocess to identify a superposition conflict and to resolve it. Notice that this subprocess occurs within the subprocess of the referential constraint checks; instead of performing the superposition subprocess here, we could have waited to perform it after performing the foreign-key checks and resolving any conflicts for the current update with respect to both its child updates and its parent updates. However, it is more efficient to integrate the superposition subprocess into the referential constraint subprocess.

Figure 10:
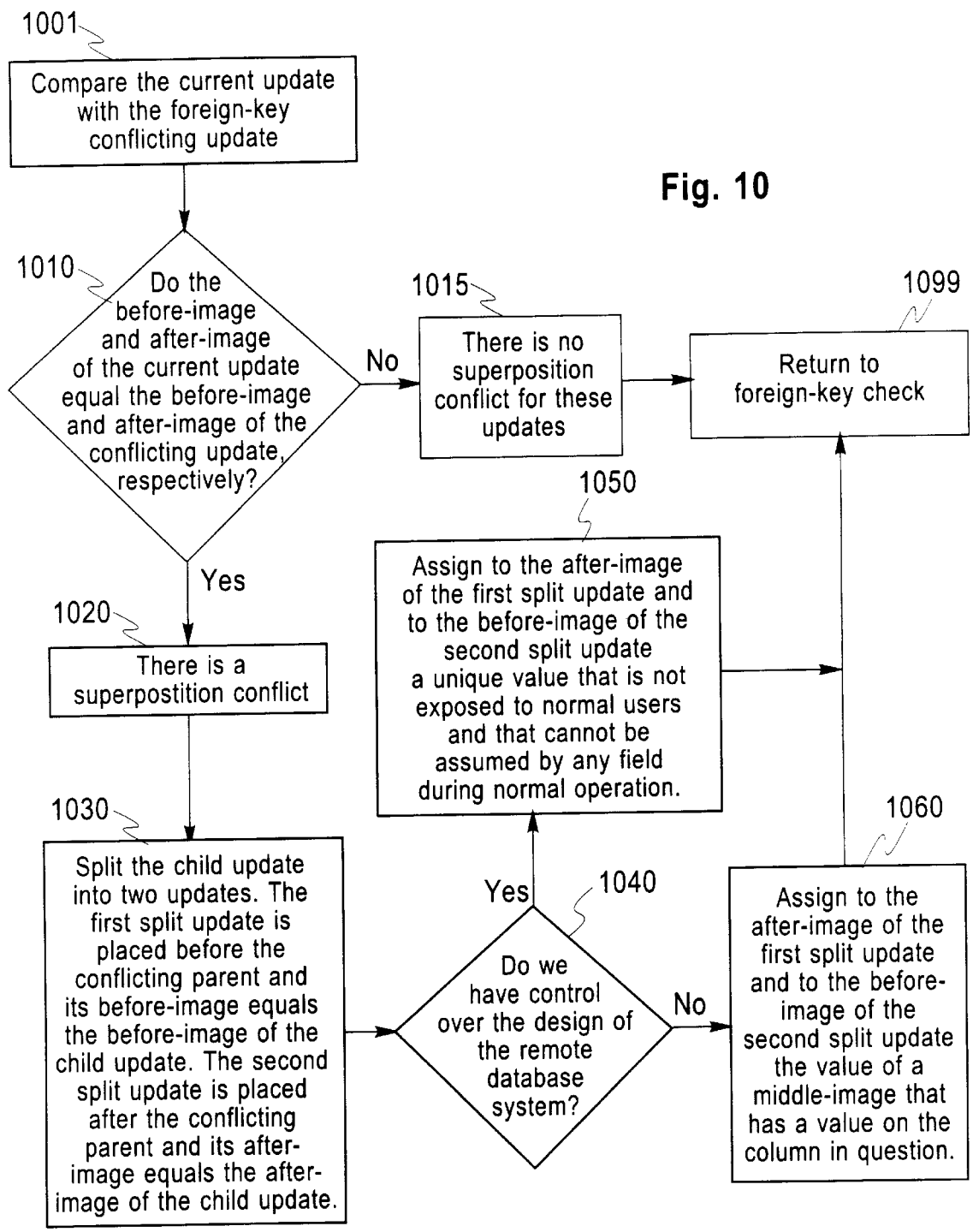
FIG. 10 is a flow chart showing the steps of identifying and resolving a superposition conflict in transformations in database systems with instant foreign-key constraint checks.

The subprocess described in FIG. 10 identifies this superposition problem for referential constraints and resolves it in a manner similar to that for the value-switching conflicts. Step 1001 denotes the place of departure from the subprocess of FIG. 9 and emphasizes comparison between the current update and the update with which there was a foreign-key conflict in steps 930 or 970. Step 1010 asks whether the before-image and the after-image of the current update equal the before-image and after-image, respectively, of the conflicting update. If this subprocess was launched from step 945, it is already known that the before-images of the current update and the conflicting update are equal; thus, in this scenario, it is sufficient to ask whether the after-images are equal. Conversely, if this subprocess was launched from step 985, it is already known that the after-images of the current update and the conflicting update are equal, and it is sufficient to ask whether the before-images are equal. The flow chart in step 1010 is worded generally to cover both cases. If step 1010 returns "NO," step 1015 explains that there is no superposition conflict for this pair of updates and the subprocess returns in step 1099 to the main referential constraint subprocess. If step 1010 returns "YES," step 1020 explains that there is a superposition conflict. Step 1030 begins to resolve the conflict by splitting the child update (which is the current update if this subprocess was launched from step 945 and is the conflicting update if this subprocess was launched from step 985) into two updates. The first split update has the same before-image as the child update had before the split, and is placed before the parent update. The second split update has the same after-image as the child update, and is placed after the parent update. Again, all that is left is assignment of values to the after-image of the first split update and the before-image of the second split update. The same two schemes used in the unique-key conflict resolution problem are proposed to solve this problem. Step 1040 asks whether we have control over the design of the remote database system. If so, step 1050 assigns to the after-image of the first split update and to the before-image of the second split update a unique value, such as 99999, that is reserved by the system and that is not exposed to normal users and cannot be assumed by any field during normal operation. This value is used only during propagation of changes from database to database, and is assigned to the vacant images of the split updates. If step 1040 returns "NO," step 1060 assigns to the after-image of the first split update and to the before-image of the second split update the value of a middle-image that has a value on the column in question. Using the example of the two superposed updates above, the child update is split into two updates, up ($c_A$, $C_k$=$v_1$→x) and up ($c_B$, $c_k$=x→$v_2$), surrounding the parent update up ($p_1$, $p_k$=$v_1$→$v_2$). If a middle-image value of $v_3$ is chosen, the three updates look like this:

up ($c_A$, $c_k$=$v_1$→$v_3$)

up ($p_1$, $p_k$=$v_1$→$v_2$)

up ($c_B$, $c_k$=X→$v_3$)

After finishing resolving the superposition conflicts, step 1099 returns to the referential constraint subprocess. If the last step encountered in FIG. 9 was step 985, the rest of the subprocess must resolve any conflicts that may have arisen when the updates were moved. The subprocess must check for referential conflicts and perform the same processing again starting with the update after the conflicting update, if any. This last step is reflected in the flow chart by steps 990 and 995. If this is not the end of the global log file, step 995 takes the next update in the global log file as the current update and the foreign-key check beginning with step 1010 is performed. If this is the end of the global log file, step 990 returns "YES" and the subprocess returns in step 999 to the main process in step 668 in FIG. 6.

After the unique-key and referential constraint checks are completed, the process in FIG. 6 returns to step 660 to determine if any more double-open segments remain. If so, the double-open segment loop continues with the next update. If not, the process continues by ordering the forward-open segments. In this loop, step 680 looks for remaining forward-open segments. If any exist, step 682 takes one of the segments and performs a superposition on the insert and update operations such that all of the operations are superposed into one insert operation. The result of this is the same as in systems without instant constraint checks: the operand record image of this superposed insert operation is the forward superposition of the operand record image of the original insert operation and the after-images of all of the update operations. This leaves segments of ins-END. On forward-open segments, because there are no update operations in a Level 2 transformation, only referential constraints are important. Thus, step 684 asks whether a referential constraint is active. If it is, the referential constraint requires the segment being ordered to be placed in the equivalent log file after all of its parent segments and before all of its child segments, as shown in step 688. If the referential constraint is not active, the segment can be ordered anywhere amongst the forward-open segments. Thus step 686 places the current segment after the previous segment and the process returns to step 680 to retrieve the next forward-open segment, if any remains. When all of the forward-open segments are ordered, step 680 returns "NO" and the process ends in step 699.

After describing the Level 2 transformation in detail, it is easier to understand that the Level 1 transformation is hardly worth doing. The Level 1 transformation contains many update operations in both the double-open segments and the forward-open segments. Because the bulk of the processing power in systems with constraint checks is used to order update operations (i.e. the unique-key and foreign-key checks and resolution and the value-switching and superposition conflicts and resolution only operate on updates), any method that reduces the number of update operations is a boon to overall system performance.

As was mentioned earlier, the Level 3 transformation can be performed in systems with instant constraint checks and the preparation process is the same as in the system without instant constraint checks. Instead of the normal UID-segments, pseudo-segments are created that include operations from multiple adjacent transactions. But, as before, when considering multiple transactions together, the pseudo-segments in a Level 3 transformation behave the same as the segments within the same transactions in a Level 2 transformation. Therefore, virtual closed segments, like closed segments within the same transaction, can be excluded from consideration and discarded. Referring back to FIG. 6, step 630 identifies and discards the virtual closed segments formed by the multiple transactions. Once that is done, the pseudo-backward-open segments are ordered before the pseudo-double-open segments which are ordered before the pseudo-forward-open segments. And just as in the Level 2 transformation, the updates in the pseudo-backward-open segments can be discarded in step 642, the updates in pseudo-double-open segments can be superposed into one update operation in step 662, and the insert and update operations in pseudo-forward-open segments can be superposed into one insert operation in step 682. There is also no difference in the operation of the subprocesses that perform the unique-key and referential constraint conflict checks and resolution, as described in step 668. Again, compared with the Level 2 transformation, the equivalent log file in Level 3 is much shorter because it deletes operations across transaction borders, operations that remain after the plain Level 2 transformations.

Two other types of constraint checks remain—partition keys and general multi-attribute constraints. However, their existence does not affect the transformations of the log files into an equivalent log file. In the case of partition keys, a unique key can be used as either a UID or as a partition key by the database system. Either way, the earlier discussion regarding unique-key checks still applies. Furthermore, if two operations are unique-key related and the unique-key is also a partition key, the operand records of these two operations must have the same partition key-values and reside on the same node, which means the operations are recorded in the same local log file. This actually simplifies the ordering problem. In the case of general multi-attribute constraints, these only occur within a single record, so there is no problem with respect to ordering of records. Thus, we need only be concerned with the unique-key and referential constraints.

While several embodiments have been illustrated and described, other variations and alternate embodiments will occur to those skilled in the art. These variations and embodiments remain within the spirit and scope of this invention.

We claim:

1. A method for constructing a global equivalent database log file using at least two local log files in a parallel or distributed database system comprising the steps of:

creating, from each local log file, a list of log entries associated with a database record;

separating said list of log entries associated with said each local log file into list segments;

performing actions on said list segments, said actions selected from the group consisting of reducing the number of said list segments and shortening said list segments; and merging remaining list segments into a second list.

2. The method according to claim 1 wherein a START symbol is added to the beginning of said list of log entries and an END symbol is added to the end of said list of log entries.

3. The method according to claim 2 wherein said log entries comprise insert operations, delete operations, and update operations.

4. The method according to claim 3 wherein said list segments are formed by examining said list of log entries and separating said list of log entries after every delete operation and before every insert operation.

5. The method according to claim 4 wherein:

said list segments including only a START symbol or only an END symbol are called empty segments;

said list segments beginning with a START symbol, ending with an END symbol, and including only at least one update operation between said START and said END entries are called double-open segments;

said list segments beginning with a START symbol, ending with a delete operation, and including only zero or more update operations between said START symbol and said delete operation are called backward-open segments;

said list segments beginning with an insert operation, ending with a delete operation, and including only zero or more update operations between said insert and said delete operations are called closed segments; and said list segments beginning with an insert operation, ending with an END symbol, and including only zero or more update operations between said insert operation and said END symbol are called forward-open segments, wherein said actions comprise the steps of:

discarding empty segments;

discarding closed segments; and reducing the length of a backward-open segment by discarding update operations included therein.

6. The method according to claim 5 wherein said merging into said second list comprises the steps of:

examining the remaining list segments of a first database record;

if one segment of said first database record remains, placing said segment at the beginning of said second list;

if two segments of said first database record remain, placing a backward-open segment of said first database record at the beginning of said second list and placing a forward-open segment of said first database record after said backward-open segment; and placing segments of a second database record after said segments of said first database record, wherein a backward-open segment of said second database record is placed before a forward-open segment of said second database record if both said segments of said second database record remain.

7. The method according to claim 6 wherein said second list can be further shortened:

by compressing a delete operation followed by an insert operation into a first superposed update operation;

by compressing an insert operation followed by at least one consecutive update operation into a superposed insert operation; and by compressing at least two consecutive update operations into a second superposed update operation.

8. The method according to claim 7 wherein:

the before-image of said first superposed update operation is the before-image of said delete operation, and the after-image of said first superposed update operation is the operand record image of said insert operation followed by said delete operation;

the operand record image of said superposed insert operation is the forward superposition of the operand record image of said insert operation and the after-images of said update operations; and the before-image of said second superposed update operation is the backward superposition of all before-images of said update operations, and the after-image of said second superposed update operation is the forward superposition of all after-images of said update operations.

9. The method according to claim 8 wherein said list of log entries associated with a database record includes entries from the same transaction.

10. The method according to claim 8 wherein said list of log entries associated with a database record includes entries from multiple adjacent transactions.

11. The method according to claim 10 wherein a series of consecutive list segments beginning with a forward-open segment, ending with a backward-open segment, and including only zero or more double-open segments between said forward-open and said backward-open segments wherein all said segments are from different transactions is called a virtual closed segment and wherein said actions further comprise the step of discarding virtual closed segments.

12. The method according to claim 1 wherein said merging into said second list adheres to constraints placed on said database system with respect to the ordering of different database records.

13. The method according to claim 5 wherein said merging into said second list adheres to constraints placed on said database system with respect to the ordering of different database records.

14. The method according to claim 13 wherein said merging into said second list comprises the steps of:

examining the remaining list segments;

placing backward-open segments at the beginning of said second list;

placing double-open segments after said backward-open segments; and placing forward-open segments after said double-open segments.

15. The method according to claim 14 wherein said placing of said backward-open segments comprises:

if a referential constraint is active, placing a segment before the parent segments of said segment and after the child segments of said segment; or if said referential constraint is not active, placing said segment after a previous segment.

16. The method according to claim 14 wherein said placing of said double-open segments comprises:
compressing all update operations into one superposed update operation; and
if any update operations are already placed in said second list,
performing a unique-key check;
resolving a unique-key conflict, if one exists;
resolving a value-switching conflict, if one exists;
performing a foreign-key check;
resolving a foreign-key conflict, if one exists; and
resolving a superposition conflict, if one exists; or
if any update operations are not already placed in said second list,
placing said segment after a previous segment.

17. The method according to claim 16 wherein the before-image of said superposed update operation is the backward superposition of all before-images of said update operations in said double-open segment, and the after-image of said superposed update operation is the forward superposition of all after-images of said update operations in said double-open segment.

18. The method according to claim 14 wherein said placing of said forward-open segments comprises:
compressing said insert operation and all update operations into one superposed insert operation; and
if a referential constraint is active, placing a segment after the parent segments of said segment and before the child segments of said segment; or
if said referential constraint is not active, placing said segment after a previous segment.

19. The method according to claim 18 wherein the operand record image of said superposed insert operation is the forward superposition of the operand record image of said insert operation in said forward-open segment and the after-images of said update operations in said forward-open segment.

20. The method according to claim 14 wherein said list of log entries associated with a database record includes entries from the same transaction.

21. The method according to claim 14 wherein said list of log entries associated with a database record includes entries from multiple adjacent transactions.

22. The method according to claim 21 wherein a series of consecutive list segments beginning with a forward-open segment, ending with a backward-open segment, and including only zero or more double-open segments between said forward-open and said backward-open segments wherein all said segments are from different transactions is called a virtual closed segment and wherein said actions further comprise the step of discarding virtual closed segments.

23. A method for constructing a global equivalent database log file using at least two local log files in a parallel or distributed database system comprising the step of treating multiple adjacent transactions in a local log file as one transaction.

24. A method for constructing a list of update operations within a global equivalent log file that adheres to constraints placed on a database system using at least two local log files comprising the steps of:
placing a first update operation after a second update operation if said first update operation appears after said second update operation in a first local log file;
placing said first update operation before said second update operation if said update operations do not appear in the same local log file and if a constraint would be violated were said first update operation to be placed after said second update operation, provided that update operations from said first local log file appearing after said second update operation in said list of update operations are repositioned in said list of update operations to appear before said first update operation; and
comparing update operations appearing in said list of update operations after said second update operation to ensure that no constraint is violated if said first update operation is placed before said second update operation.

25. The method according to claim 24 wherein a unique-key constraint is violated if either a before-image value or an after-image value of said first update operation is equal to an active after-image value of said second update operation.

26. The method according to claim 24 wherein a referential constraint is violated if:
in the case in which said first update operation is a child update operation and said second update operation is a parent update operation, a before-image value of said child update operation is equal to a before-image value of said parent update operation; or
in the case in which said first update operation is a parent update operation and said second update operation is a child update operation, an after-image value of said parent update operation is equal to an after-image value of said child update operation.

27. The method according to claim 24 wherein said first and second update operations are results of superpositions of update operations, a unique-key constraint is violated if, after making links between said first update operation and update operations already appearing in said list when an after-image value of said first update operation equals a before-image value of any of said update operations and following said links to a second update operation that appears before the rest of said update operations, a before-image value of said first update operation equals an after-image value of said second update operation; and
said constraint violation is remedied by splitting said second update operation into two update operations wherein
a first split update operation is placed in said list of update operations in the position in which said second update operation was located, and a before-image value of said first split update operation equals a before-image value of said second update operation; and
a second split update operation is placed in said list of update operations after said first update operation and an after-image value of said second split update operation equals an after-image value of said first update operation; and
an after-image value of said first split update operation and a before-image value of said second split update operation are equal to each other and are equal to either a unique value not used as a value in said database system or a middle-image value that does not present a constraint violation.

28. The method according to claim 24 wherein said first and second update operations are results of superpositions of update operations, a referential constraint is violated if:
a before-image of a child update operation equals a before-image of a parent update operation and an after-image of said child update operation equals an after-image of said parent update operation; and said constraint violation is remedied by splitting said child update operation into two update operations wherein
a first split update operation is placed in said list of update operations before said parent update operation, and a before-image value of said first split update operation equals said before-image value of said child update operation; and
a second split update operation is placed in said list of update operations after said parent update operation, and an after-image value of said second split update operation equals said after-image value of said child update operation; and
an after-image value of said first split update operation and a before-image value of said second split update operation are equal to each other and are equal to either a unique value not used as a value in said database system or a middle-image value that does not present a constraint violation.

* * * * *

UNITED STATES PATENT AND TRADEMARK OFFICE
CERTIFICATE OF CORRECTION

PATENT NO. : 5,890,154

DATED : March 30, 1999

INVENTOR(S) : Hsiao et al.

It is certified that error appears in the above-identified patent and that said Letters Patent is hereby corrected as shown below:

Column 5, line 56, "EAD" should be -- END --;
Column 5, line 57, "EAD" should be -- END --.

Signed and Sealed this

Eighth Day of February, 2000

Attest:

Q. TODD DICKINSON

Attesting Officer

Commissioner of Patents and Trademarks